US011227100B2

(12) United States Patent
Barker et al.

(10) Patent No.: US 11,227,100 B2
(45) Date of Patent: *Jan. 18, 2022

(54) METHOD AND SYSTEM FOR SHARING DOCUMENTS BETWEEN ON-DEMAND SERVICES

(71) Applicant: salesforce.com, inc., San Francisco, CA (US)

(72) Inventors: Timothy J. Barker, Great Shefford (GB); Jonathan Levine, Brooklyn, NY (US); James Johnson, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/579,605

(22) Filed: Sep. 23, 2019

(65) Prior Publication Data
US 2020/0019598 A1 Jan. 16, 2020

Related U.S. Application Data

(63) Continuation of application No. 15/450,693, filed on Mar. 6, 2017, now Pat. No. 10,423,715, which is a
(Continued)

(51) Int. Cl.
*G06F 40/166* (2020.01)
*G06F 16/16* (2019.01)
(Continued)

(52) U.S. Cl.
CPC .......... *G06F 40/166* (2020.01); *G06F 16/168* (2019.01); *G06F 16/176* (2019.01); *G06F 16/182* (2019.01); *G06F 16/958* (2019.01)

(58) Field of Classification Search
CPC .... G06F 40/166; G06F 16/182; G06F 16/958; G06F 16/176; G06F 16/168
(Continued)

(56) References Cited

U.S. PATENT DOCUMENTS 5,577,188 A 11/1996 Zhu
5,608,872 A 5/1997 Schwartz et al.
(Continued)

OTHER PUBLICATIONS

Hetzer, et al., "Resource Reservation in Advance for Content On-demand Services," 2005, IEEE, 6 pages.

*Primary Examiner* — Shahid A Alam
(74) *Attorney, Agent, or Firm* — Kowert, Hood, Munyon, Rankin & Goetzel, P.C.

(57) ABSTRACT

A method for sharing documents between on-demand services is provided. In an embodiment, a user of a first on-demand service may be able to view a list of content that includes content stored at the first on-demand service and content stored at a second on-demand service. The content of the second on-demand service may be associated with information about the content, allowing the content to be shared among multiple users of the first on-demand service. The user wanting to view the content, select or click on an indicator identifying the content, a connection to the second on-demand service is established, and images of the content are sent from the second on-demand service to the first on-demand service.

19 Claims, 42 Drawing Sheets

Related U.S. Application Data continuation of application No. 14/447,511, filed on Jul. 30, 2014, now Pat. No. 9,588,982, which is a continuation of application No. 13/791,825, filed on Mar. 8, 2013, now Pat. No. 8,832,054, which is a continuation of application No. 12/584,954, filed on Sep. 14, 2009, now Pat. No. 8,538,942.

(60) Provisional application No. 61/191,914, filed on Sep. 12, 2008.

(51) Int. Cl.
  *G06F 16/176* (2019.01)
  *G06F 16/182* (2019.01)
  *G06F 16/958* (2019.01)

(58) Field of Classification Search
  USPC .......................................................... 707/705
  See application file for complete search history.

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,029,175 A | 2/2000 | Chow et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,959,308 B2 | 10/2005 | Gramsamer et al. | |
| 7,062,502 B1 | 6/2006 | Kesler | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,395,315 B2 | 7/2008 | Colson et al. | |
| 7,401,094 B1 | 7/2008 | Kesler | |
| 7,412,455 B2 | 8/2008 | Dillon | |
| 7,508,789 B2 | 3/2009 | Chan | |
| 7,599,920 B1 | 10/2009 | Fox et al. | |
| 7,620,655 B2 | 11/2009 | Larsson et al. | |
| 7,698,160 B2 | 4/2010 | Beaven et al. | |
| 7,707,249 B2 | 4/2010 | Spataro et al. | |
| 7,779,039 B2 | 8/2010 | Weissman et al. | |
| 7,814,052 B2 | 10/2010 | Bezar et al. | |
| 7,818,298 B2 * | 10/2010 | Barker ................... | G06F 16/93 707/638 |
| 7,836,019 B2 | 11/2010 | Barker et al. | |
| 7,921,299 B1 * | 4/2011 | Anantha ............ | H04N 21/2543 713/187 |
| 7,991,790 B2 | 8/2011 | Barker et al. | |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,140,576 B1 | 3/2012 | Viripaeff et al. | |
| 8,275,836 B2 | 9/2012 | Beaven et al. | |
| 8,301,612 B2 | 10/2012 | Barker et al. | |
| 8,312,047 B2 | 11/2012 | Barker et al. | |
| 8,457,545 B2 | 6/2013 | Chan | |
| 8,484,111 B2 | 7/2013 | Frankland et al. | |
| 2001/0044791 A1 | 11/2001 | Richter et al. | |
| 2001/0049819 A1 | 12/2001 | Pereboom | |
| 2002/0019827 A1 * | 2/2002 | Shiman ................... | G06F 16/93 |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0154387 A1 * | 8/2003 | Evans ................... | G06F 21/10 713/193 |
| 2003/0159136 A1 | 8/2003 | Huang et al. | |
| 2003/0187921 A1 | 10/2003 | Diec | |

(56) References Cited

U.S. PATENT DOCUMENTS

| | | |
|---|---|---|
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0002988 A1 | 1/2004 | Seshadri et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0230903 A1 | 11/2004 | Elza et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0010635 A1 | 1/2005 | Schwesig et al. |
| 2005/0050555 A1 | 3/2005 | Exley et al. |
| 2005/0091098 A1 | 4/2005 | Brodersen et al. |
| 2005/0223022 A1 | 10/2005 | Weissman et al. |
| 2006/0021019 A1 | 1/2006 | Hinton et al. |
| 2006/0031308 A1 | 2/2006 | Colson et al. |
| 2006/0053196 A1 | 3/2006 | Spataro et al. |
| 2006/0116896 A1 | 6/2006 | Fowler et al. |
| 2006/0136511 A1 | 6/2006 | Ngo et al. |
| 2006/0143558 A1 | 6/2006 | Albornoz et al. |
| 2006/0235714 A1* | 10/2006 | Adinolfi ............... G06Q 40/06 705/1.1 |
| 2006/0253830 A1 | 11/2006 | Rajanala et al. |
| 2007/0060099 A1 | 3/2007 | Ramer et al. |
| 2007/0061384 A1* | 3/2007 | Harrington ........... G06F 40/143 |
| 2007/0100817 A1* | 5/2007 | Acharya ............ G06Q 30/0246 |
| 2007/0100960 A1 | 5/2007 | Eichstaedt et al. |
| 2007/0143379 A1 | 6/2007 | i Dalfo et al. |
| 2007/0150515 A1 | 6/2007 | Brave et al. |
| 2007/0208834 A1* | 9/2007 | Nanamura ............. G06Q 30/06 709/220 |
| 2007/0220417 A1 | 9/2007 | Mathew et al. |
| 2007/0226204 A1 | 9/2007 | Feldman |
| 2007/0226807 A1 | 9/2007 | Ginter et al. |
| 2007/0233820 A1 | 10/2007 | Schneider |
| 2007/0260648 A1 | 11/2007 | Friesenhahn et al. |
| 2008/0010243 A1* | 1/2008 | Weissman ............... G06F 16/21 |
| 2008/0104408 A1 | 5/2008 | Mayer |
| 2008/0126333 A1 | 5/2008 | Bezar et al. |
| 2008/0127310 A1 | 5/2008 | Robbins et al. |
| 2008/0249972 A1 | 10/2008 | Dillon |
| 2008/0270459 A1 | 10/2008 | Grewal et al. |
| 2008/0306883 A1 | 12/2008 | Baffier et al. |
| 2009/0013011 A1 | 1/2009 | Barker et al. |
| 2009/0024609 A1 | 1/2009 | Barker et al. |
| 2009/0024673 A1 | 1/2009 | Barker et al. |
| 2009/0049053 A1 | 2/2009 | Barker et al. |
| 2009/0063415 A1 | 3/2009 | Chatfield et al. |
| 2009/0100342 A1 | 4/2009 | Jakobson |
| 2009/0164915 A1 | 6/2009 | Gasn et al. |
| 2009/0177744 A1 | 7/2009 | Marlow et al. |
| 2009/0300605 A1 | 12/2009 | Edwards et al. |
| 2010/0076946 A1 | 3/2010 | Barker et al. |
| 2010/0268740 A1 | 10/2010 | Barker et al. |
| 2011/0197186 A1 | 8/2011 | Barker et al. |
| 2011/0252314 A1 | 10/2011 | Barker et al. |
| 2011/0289401 A1 | 11/2011 | Fischer |
| 2012/0143817 A1 | 6/2012 | Prabaker et al. |
| 2012/0143917 A1 | 6/2012 | Prabaker et al. |
| 2012/0260191 A1* | 10/2012 | Ballard ................. G06F 3/0484 715/744 |
| 2013/0036086 A1 | 2/2013 | Barker et al. |
| 2013/0036142 A1 | 2/2013 | Barker et al. |
| 2013/0055159 A1 | 2/2013 | Levine et al. |
| 2013/0218948 A1 | 8/2013 | Jakobsen |
| 2013/0218949 A1 | 8/2013 | Jakobsen |
| 2013/0218966 A1 | 8/2013 | Jakobsen |

* cited by examiner

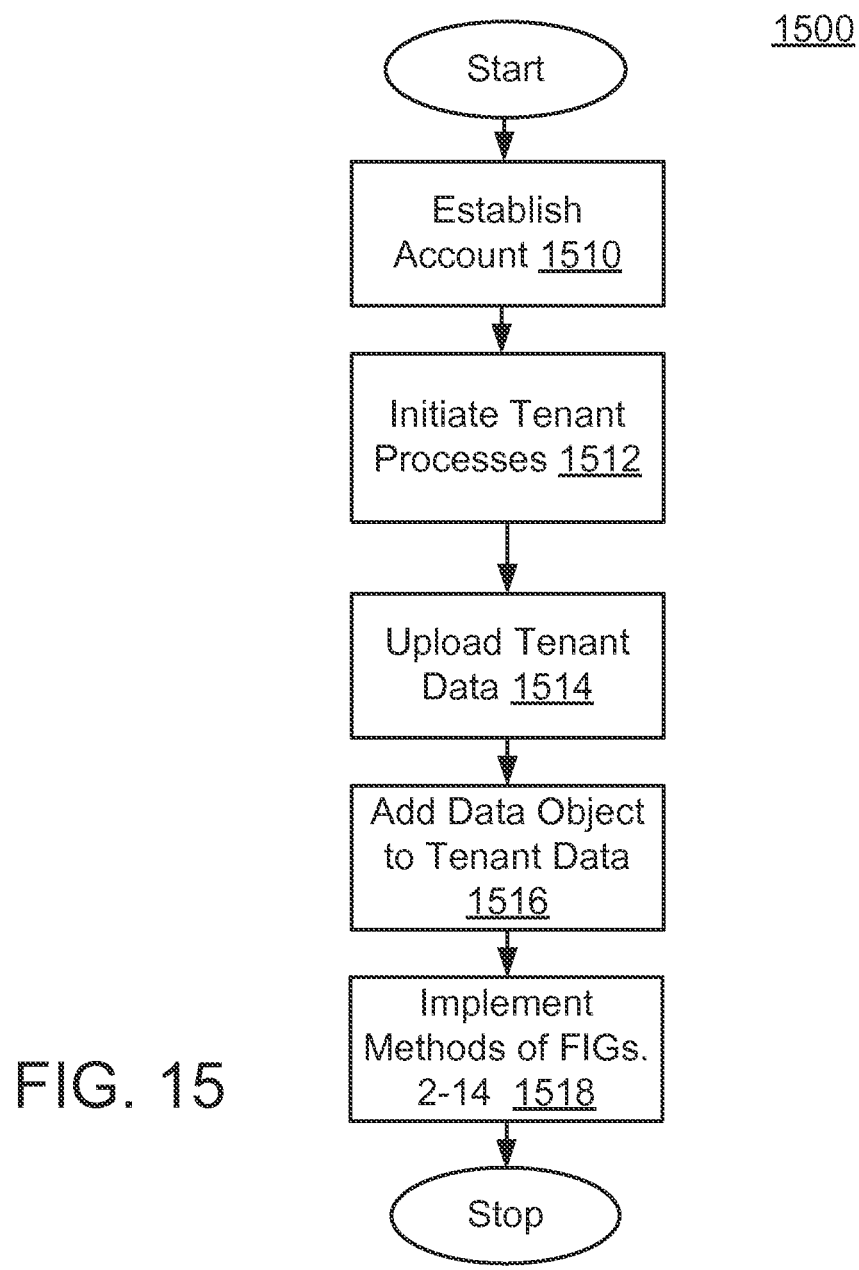

METHOD AND SYSTEM FOR SHARING DOCUMENTS BETWEEN ON-DEMAND SERVICES

CLAIM OF PRIORITY

This application is a continuation of U.S. application Ser. No. 15/450,693, filed Mar. 6, 2017 (now U.S. Pat. No. 10,423,715), which is a continuation of application Ser. No. 14/447,511, filed Jul. 30, 2014 (now U.S. Pat. No. 9,588,982), which is a continuation of U.S. application Ser. No. 13/791,825, filed Mar. 8, 2013 (now U.S. Pat. No. 8,832,054), which is a continuation of U.S. application Ser. No. 12/584,954, filed Sep. 14, 2009 (now U.S. Pat. No. 8,538,942), which claims priority to U.S. Provisional Appl. No. 61/191,914, filed Sep. 12, 2008 the disclosures of each of the above-referenced applications are incorporated by reference herein in their entireties.

CROSS REFERENCE TO RELATED APPLICATIONS

The following commonly owned, co-pending United States Patents and Patent Applications, including the present application, are related to each other. Each of the other patents/applications are incorporated by reference herein in its entirety:

U.S. patent application Ser. No. 11/825,393 entitled SYSTEM AND METHOD FOR TRACKING DOCUMENTS IN AN ON-DEMAND SERVICE, by Timothy J. Barker et al., filed Jul. 6, 2007;

U.S. patent application Ser. No. 11/880,197 entitled SYSTEM AND METHOD FOR STORING DOCUMENTS ACCESSED BY MULTIPLE USERS IN AN ON-DEMAND SERVICE, by Timothy Barker et al., filed Jul. 20, 2007;

U.S. patent application Ser. No. 11/893,617 entitled Method and System for Pushing Data to Subscribers in an On-Demand Service, by Timothy J. Barker et al., filed Aug. 15, 2007;

U.S. patent application Ser. No. 11/879,535 entitled System and Method for Tracking Documents in an On-Demand Service, by Timothy J. Barker et al., filed Jul. 17, 2007; and U.S. patent application Ser. No. 12/584,954 entitled METHOD AND SYSTEM FOR SHARING DOCUMENTS BETWEEN ON-DEMAND SERVICES, by Timothy J. Barker et al., filed Sep. 14, 2009.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to sharing documents and information between on-demand services in a database network system.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional on-demand service, users access their documents stored in one logical storage space associated with the provider of a particular on-demand service. A user of such a conventional system typically retrieves documents from, and stores documents on, the system using the user's own systems. A user system might remotely access one of a plurality of server systems that might in turn access the on-demand service of the service provider. Document retrieval from the system might include the issuance of a query from the user system to the document management system of the on-demand service. The on-demand service may process such a request received in the form of a query and might send to the user system information about documents stored at the on-demand service that are relevant to the request and/or the document relevant to the request.

Unfortunately, sharing documents stored on document management systems of different service providers using conventional on-demand service approaches might be cumbersome, or too complex an activity to be practical to an average person.

Accordingly, it is desirable to provide techniques enabling the ability to share documents among one or more on-demand services to users to improve the ease of use of the system.

BRIEF SUMMARY OF THE INVENTION

In accordance with embodiments, there are provided mechanisms and methods for sharing documents between on-demand services. These mechanisms and methods for sharing documents between on-demand services can enable embodiments to provide user access to documents and information stored on separate on-demand services. The ability of embodiments to provide for sharing of documents between on-demand services can enable improved and more efficient access to documents and various other information types that are stored on separate on-demand services.

In an embodiment, a method for sharing documents between on-demand services (e.g., Google™, Inc., Salesforce.com®, Inc., etc.) is provided. In an embodiment, first and/or second on-demand service may be multi-tenant services, which may include multi-tenant databases. In an embodiment, a user of a first on-demand service may be able to view a list of content that includes content stored at the first on-demand service and content stored at a second on-demand service. The content of the second on-demand service may be associated with information about the content, allowing the content to be shared among multiple users of the first on-demand service. The user wanting to view the content, select or click on an indicator identifying the content, a connection to the second on-demand service is established, and images of the content are sent from the second on-demand service to the first on-demand service. The user that has content stored on a second on-demand service that the user wants to share, may first select the content and establish an association of the content on the second on-demand service with information and store the information and the association at the first on-demand service. Then the user may publish the content to a shared work space on the first on-demand system. In this specification the terms document and content are used interchangeably. The word document may be substituted for the word content to get a specific embodiment and the word content may be substituted for document to get a broader statement. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Each embodiment disclosed herein may be used or otherwise combined with any of the other embodiments disclosed. Any element of any embodiment may be used in any embodiment.

While the present invention is described with reference to an embodiment in which techniques for sharing documents and information between on-demand services are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 15 illustrates a flowchart of an embodiment of a method of using the environment of FIGS. 1A and 1B;

DETAILED DESCRIPTION OF THE INVENTION

Systems and methods are provided for sharing documents between on-demand services. The systems and methods provided for sharing documents between on-demand services can enable embodiments to provide user access to documents and information stored on separate on-demand services.

Figure 1A:
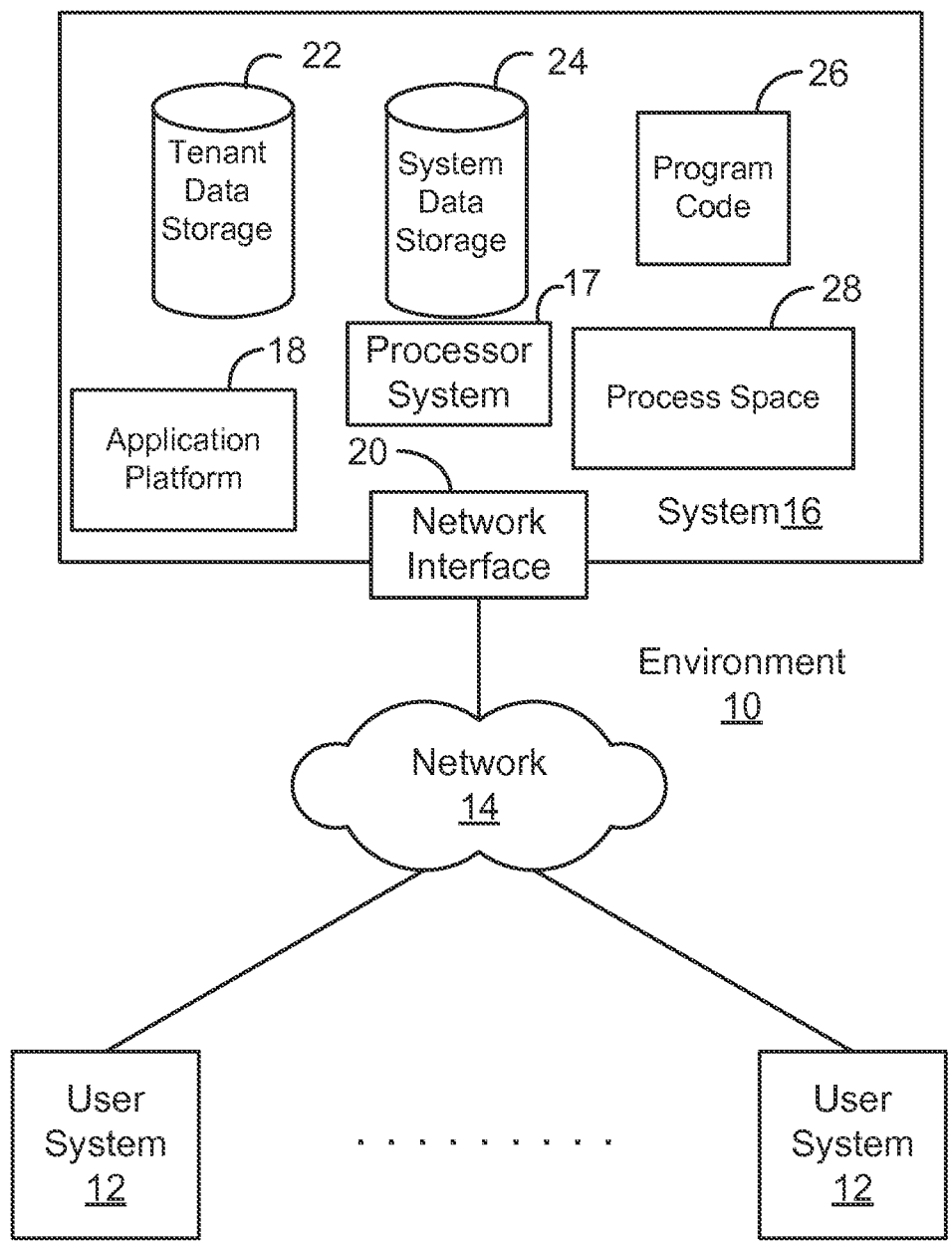
FIG. 1A illustrates a block diagram of an example of an environment wherein an on-demand database service might be used.
Figure 1B:
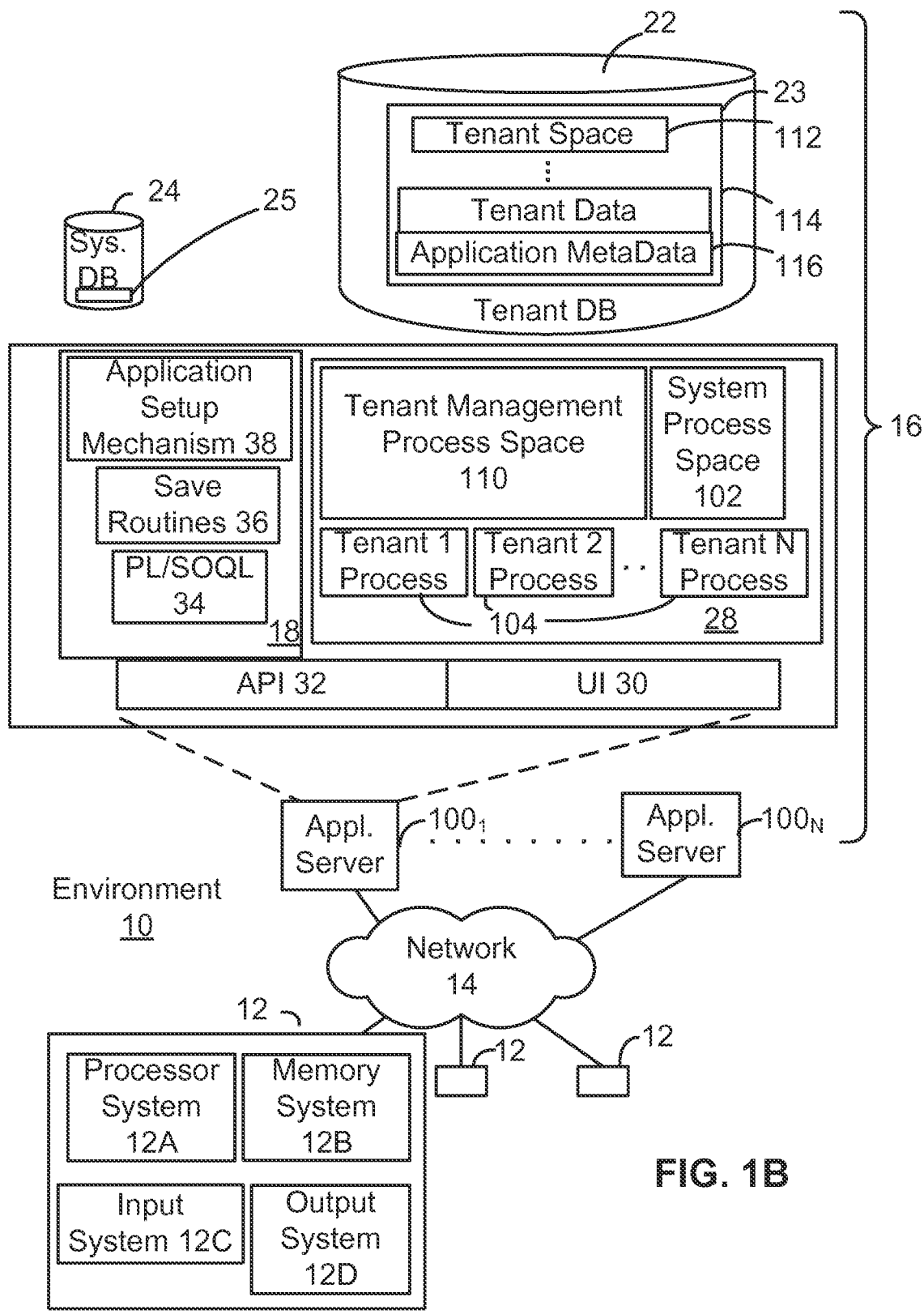
FIG. 1B illustrates a block diagram of an embodiment of elements of FIG. 1A and various possible interconnections between these elements.

Next, mechanisms and methods for providing and sharing documents and content between on-demand services will be described with reference to example embodiments.
System Overview FIGS. 1A and 1B show an example of an on-demand multi-tenant database, which is an example of an on-demand service, between which information may be shared. FIGS. 1A and 1B serve as an exemplary environment within which the user interface of FIGS. 4-14 may be used.

FIG. 1A illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

In FIG. 1A environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1A (and in more detail in FIG. 1B) user systems 12 might interact via a network 14 with an on-demand database service, which is system 16.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

Continuing with FIG. 1A, user systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1A, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1A in conjunction with FIG. 1B, includes a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 1B also illustrates environment 10. However, in FIG. 1B elements of system 16 and various interconnections in an embodiment are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

Figure 1C:
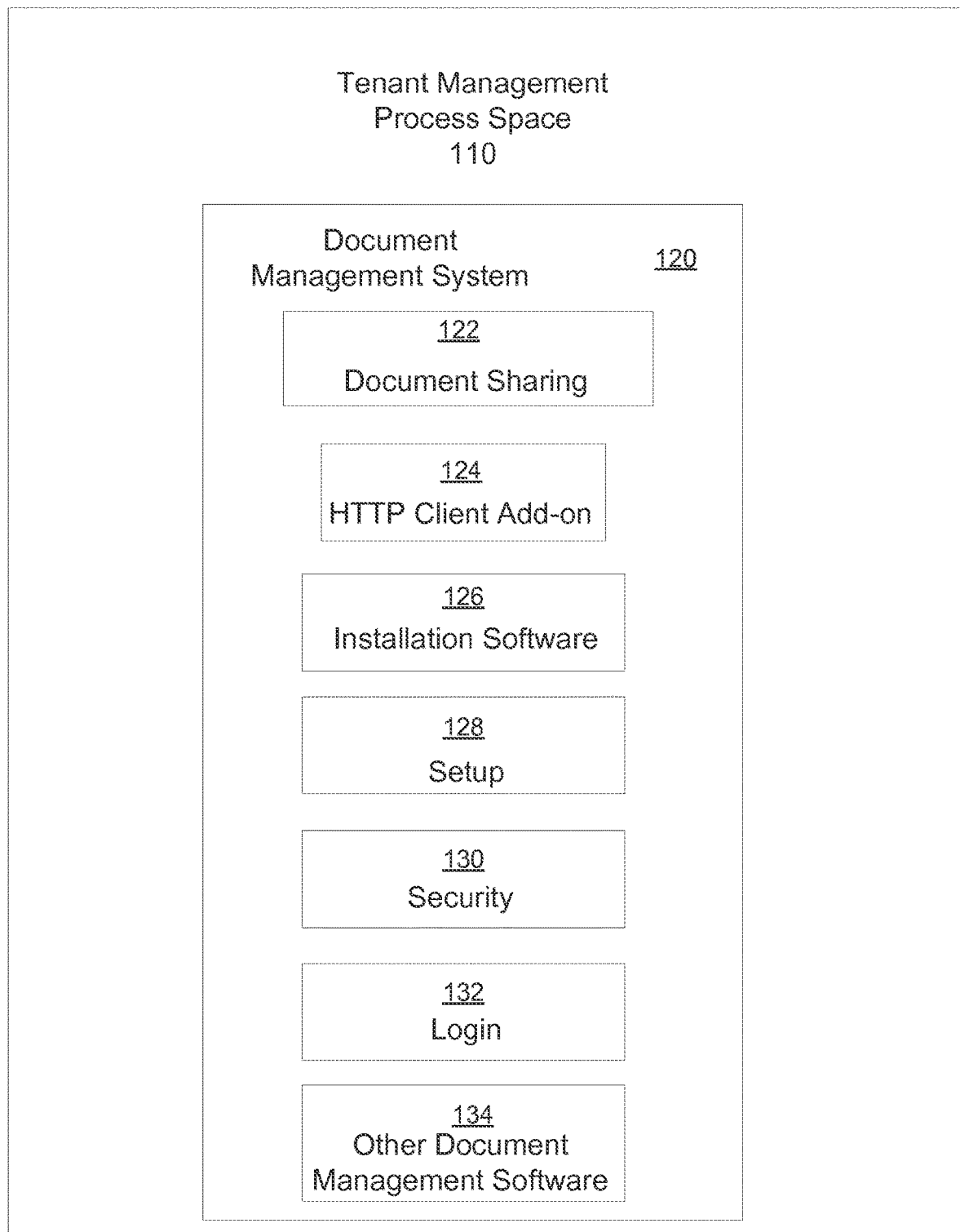
FIG. 1C illustrates a block diagram of an embodiment of a document management system, which may reside within the environment of FIGS. 1A and 1B.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers Document Management System FIG. 1C illustrates a block diagram of an embodiment of a tenant management process space 110 (FIGS. 1A and 1B), which may include document management system (DMS) 120. DMS 120 may include document sharing 122, HTTP client add-on 124, installation software 126, setup 128, security 130, login 132, other document management software 134. In other embodiments, tenant management process space 110 may not have the same elements as those listed above and/or may have other elements instead of, or in addition to, those listed above.

Although in the embodiment of FIG. 1C, the document management system 120 is part of the tenant management space 110 in other embodiments DMS 120 may be located elsewhere such as a separate object within process space 28. In an embodiment, DMS 120 manages the retrieval and saving of documents. DMS 120 may manage where documents are saved and which users have access to those documents. HTTP client add-on 124 is code that is added to a user's HTTP client (e.g., browser) for launching various processes that are carried out by DMS 120, such as document sharing 122.

Document sharing 122 may include an algorithm for retrieving documents (or other content) from a variety of locations within system 16, from other on-demand services that were chosen by the user, and/or from one or more specific pre-chosen on-demand services Google®, and/or Yahoo!®. In an embodiment, document sharing 122 may include algorithms specifically tailored for retrieving content from each of the pre-chosen on-demand services and/or a generic algorithm designed to be able to retrieve documents from nearly any on-demand service that users may specify (without having foreknowledge of what on-demand services user may specify). In another embodiment, document sharing 122 may include an algorithm that is an HTTP client to the other on-demand service that is opened from the system 16. From the point of view of the user, the user's standard HTTP client remains open, and the contents that are made available via system 16's HTTP client are viewed via the user's HTTP client. As a consequence, the user never leaves the website of the system 16 (the current on-demand service) while viewing the content on the other on-demand service.

The ability of embodiments of document sharing 122 to provide for sharing of documents between on-demand services can enable improved and more efficient access to documents and various other information types that are stored on separate on-demand services. In an embodiment, a method for sharing documents between on-demand services (e.g., Google, Inc., Salesforce.com, Inc., etc.) is provided. In an embodiment document sharing 122 may include machine instructions for implementing a method having the following steps. A request from a user of a first on-demand service may be received. In response to the request, the first on-demand service may initiate the establishing of an association of content (e.g., documents, such as spreadsheets, photos, etc.) from an application provided by a second on-demand service with data of the tenant stored at the first on-demand service. An indicator may be stored at the first on-demand service. The indicator may include a link that opens a webpage for locating the content of the second on-demand service and for creating a content wrapper for the content of the second on-demand service into a content storage area of the first on-demand service. A file wrapper is a place in storage for information related to a file and for storing code for an interface to the content that is activated when the user indicates to open the content (e.g. by clicking on an icon representing the content). The content wrapper associates the content with a specific application that can read and edit the content. Whether the content is stored on the first or second database service, when the content is opened, the first database service opens the content with the application that the file wrapper associates with the content, and consequently the user does not need to have the application associated with the content to open the content.

In an embodiment, a user of a first on-demand service (e.g., a web based database) may establish a pointer within the first on-demand service that points to a document or content in a second on-demand service. The user may utilize the pointer to access the document that belongs to the second on-demand service from the first on-demand service (e.g., a website). In this specification, the terms "on-demand service" is used interchangeable with the terms a "website" and "web based database." Accordingly, except for where the context indicates otherwise, any of these terms may be substituted one for another to obtain a different embodiment. In embodiments of the invention, a pointer is used as an example of a link. However, any type of link may be substituted for the pointer wherever a pointer is mentioned in this specification. In an embodiment, a link is placed on one or more web pages of the first on-demand website and/or on one or more pages of the second on-demand website that initiate establishing a pointer. In an embodiment, upon activating a link for establishing a pointer, an interface is opened that facilitates establishing the pointer without having to open the second on-demand database or the other of the two on-demand databases.

In an embodiment, part of the process of establishing a pointer or link includes presenting one or more web pages to a user of a first on-demand service for receiving relational information, which is information about what other documents, products, projects, other people, and/or entities the content on a second on-demand service is related. In addition, following the publishing of the pointer, the relevance (e.g., to a search) and context (e.g., category) may be available to other users that have access to the pointer.

In an embodiment, a user of a first on-demand database may also be able to establish and/or modify the relevance and context (e.g., the category) of a pointer after the pointer has been published in addition to or instead of establishing the relationship and/or relevance prior to publishing the pointer.

In an embodiment, the clicks or selections of users of a first on-demand service may be tracked and analyzed to assist the tenant in determining the usefulness of the documents or other information on a second on-demand service. In an embodiment, tools are provided for analyzing the data and for presenting the data and analysis about the clicks that were collected. For example, tools may be provided for presenting graphs of the clicks overtime that related to a particular document or portion of the second on-demand database service.

In an embodiment, when a user of a first on-demand service accesses content of a second on-demand service, depending on the level of access of the content being accessed, the user may be prompted for login information prior to granting access. In an embodiment, login information may be requested for only the initial or first time a user attempts to access content on a second on-demand service, and each subsequent time the user requests access to the information on the second on-demand service, the login information, which was has already been provided, is used to automatically login without the user being bothered to view the login prompt. Alternatively, a tenant may have settings that allow the user to choose whether to be prompted for the login input each time access is requested or only the first time access is requested. In an embodiment, a user of a first on-demand service (e.g., a web based database) may establish a pointer within the first on-demand service that points to a document or content in a second on-demand service. The user may utilize the pointer to access the document that belongs to the second on-demand service from the first on-demand service (e.g., website).

Continuing with FIG. 1C, installation software 126 installs HTTP client add-on 124 into the user's browser. Setup 128 sets up document sharing 122 on system 16 for the user. For example setup 128 may include an algorithm for establishing an initial connection with another on-demand service. Setup 128 may collect the user's password, the user name of the user on the other on-demand service, a customer identifier, the URL of the other on-demand service, and/or other account information, which are used for logging in and/or accessing information on the other. Setup 128 may setup an initial connection to user chosen on-demand services and/or on-demand services for which information was already preloaded into system 16. Setup 128 may include algorithms specifically tailored for setting up access with specific on-demand services. For example, setup 128 may include a specific option for establishing a connection to documents at Google®, and/or Yahoo!®. After running setup 128 to establish an initial connection with another on-demand service, document sharing 122 may establish links to content within that on-demand service and/or retrieve content from that on-demand service. Security 130 determines which users may access a particular document and/or via which workspaces the document may be accessed. Security 130 may allow a user to determine whether a document has been available to a particular group or whether only the user can view the document. Login 132 is an algorithm that logs the user into another on-demand service to allow sharing between the other on-demand service and the system 16. In an embodiment, login 132 opens a link, which when selected opens a webpage that requests login information, needed for logging into the other on-demand service, from the user. In another embodiment, login 132 automatically logs the user into another on-demand service when the user requests a document from the other on-demand service. Other document management software 134 may perform other document management functions, such as those discussed in U.S. patent application Ser. No. 11/893,617 entitled Method and System for Pushing Data to Subscribers in an On-Demand Service, by Timothy J. Barker et al., filed Aug. 15, 2007, cited above, for example.

Tenant Data

Figure 1D:
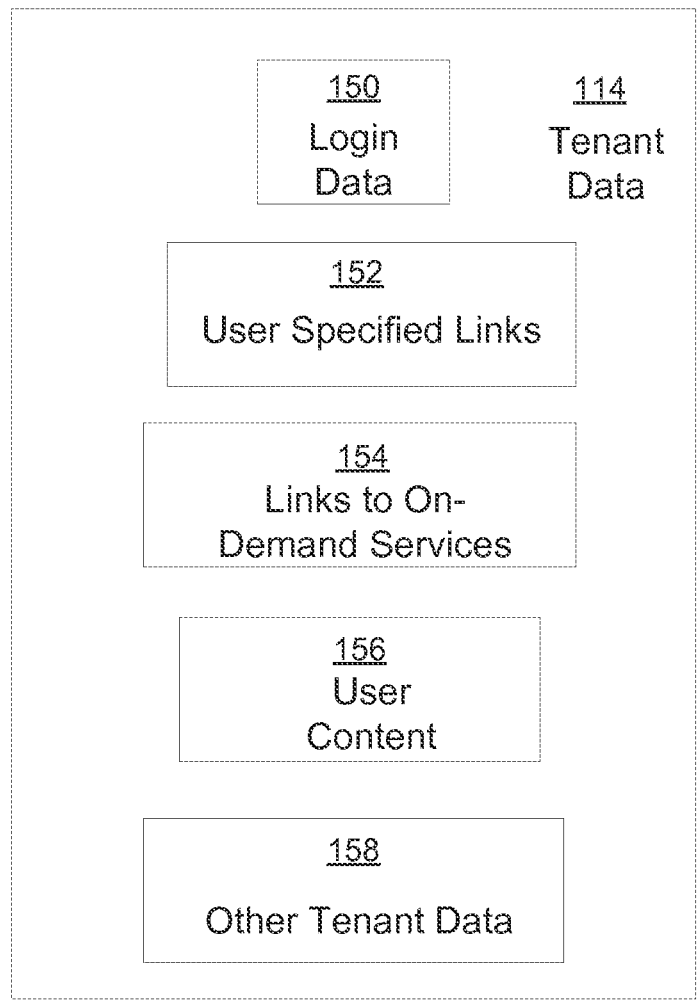
FIG. 1D shows a block diagram of an embodiment of the tenant data of FIG. 1B.

FIG. 1D shows a block diagram of an embodiment of the tenant data 114 of FIG. 1B. The tenant data 114 may include user login data 150, user specified links 152, on-demand services links 154, user content 156, and other tenant data 158. In other embodiments, tenant data 114 may not have the same elements as those listed above and/or may have other elements instead of, or in addition to, those listed above.

Tenant data 114 was described above in conjunction with FIG. 1B. User login data 150 may include user data necessary for automatically login to other on-demand services, such as the data collected by setup 128 and/or the data used by automatic login 132. User specified links 152 may include links to documents (or other content) in user specified on-demand services, where the user specified on-demand services are on-demand services that the user inputted into system 16, and which system 16 may not have had any prior information about, for example. On-demand services links 154 may include links to content at on-demand services (e.g., on-demand services 1-N) for which the information about the on-demand service was already in system 16. User content 156 may include links to user content within system 16. User content 156 may be separated into different types of content and/or identified according to the type of content. For example, documents produced by different software may be identified differently. Spreadsheets, slide shows, images, and word processing type documents may be identified differently. As another example, documents produced by Excel, MS Word, WordPerfect, Power Point, Adobe Acrobat, may each be designated differently.

Memory System of User System

Figure 1E:
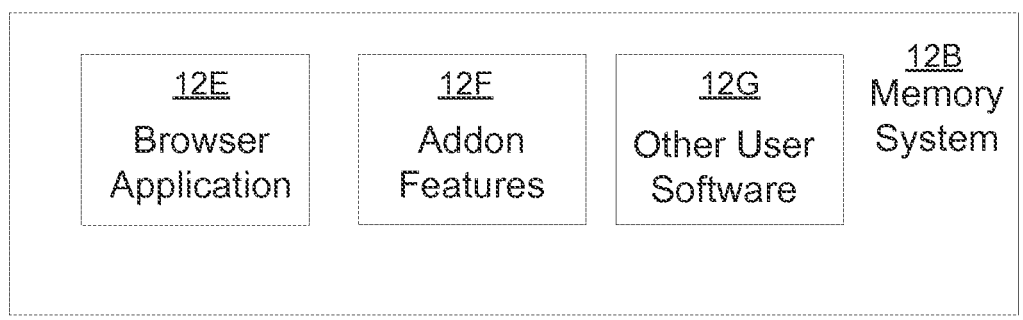
FIG. 1E shows a block diagram of the memory system of the user system of FIGS. 1A and B.

FIG. 1E shows a block diagram of the memory system 12B of the user system 12 of FIGS. 1A and B. Memory system 12B may include HTTP client 12E, which in turn may include add-on 12F and other user software 12G. In other embodiments, memory system 12B may not have the same elements as those listed above and/or may have other elements instead of, or in addition to, those listed above.

Memory system 12B was generally described above in conjunction with FIGS. 1A and 1B. FIG. 1E shows different logical blocks of memory that may be included in memory system 12B. Logical blocks of memory are portions of memory that may not necessarily be physically contiguous, but have identifiers linking each portion to other portions as parts of one entity (such as, as different parts of the same document, different parts of the same file, different parts of the same program, and/or as different parts of the same object). In an embodiment, HTTP client 12E may be a logical memory block that may be set aside for storing a browser application or other HTTP client, which may be used for communicating with system 16 for a variety of purposes. For example, HTTP client 12E may be used to access system 16 and retrieve documents from another on-demand service via system 16. Add-on 12F may be a logical block within HTTP 12E. Add-on 12F may be an embodiment of HTTP client add-on 124, which was installed by installation software 126. However, add-on 12F is the add-on after installation that resides within user system 12, while HTTP client add-on 124 is the same software, but prior to installation. Other user software 12G may include other software for running user system 12, such as an operating system, device drivers, a word processing application, a spreadsheet application, a graphics application, and/or other user applications.

Setup Methods for Establishing a Connection Between On-Demand Service Accounts

Figure 1F:
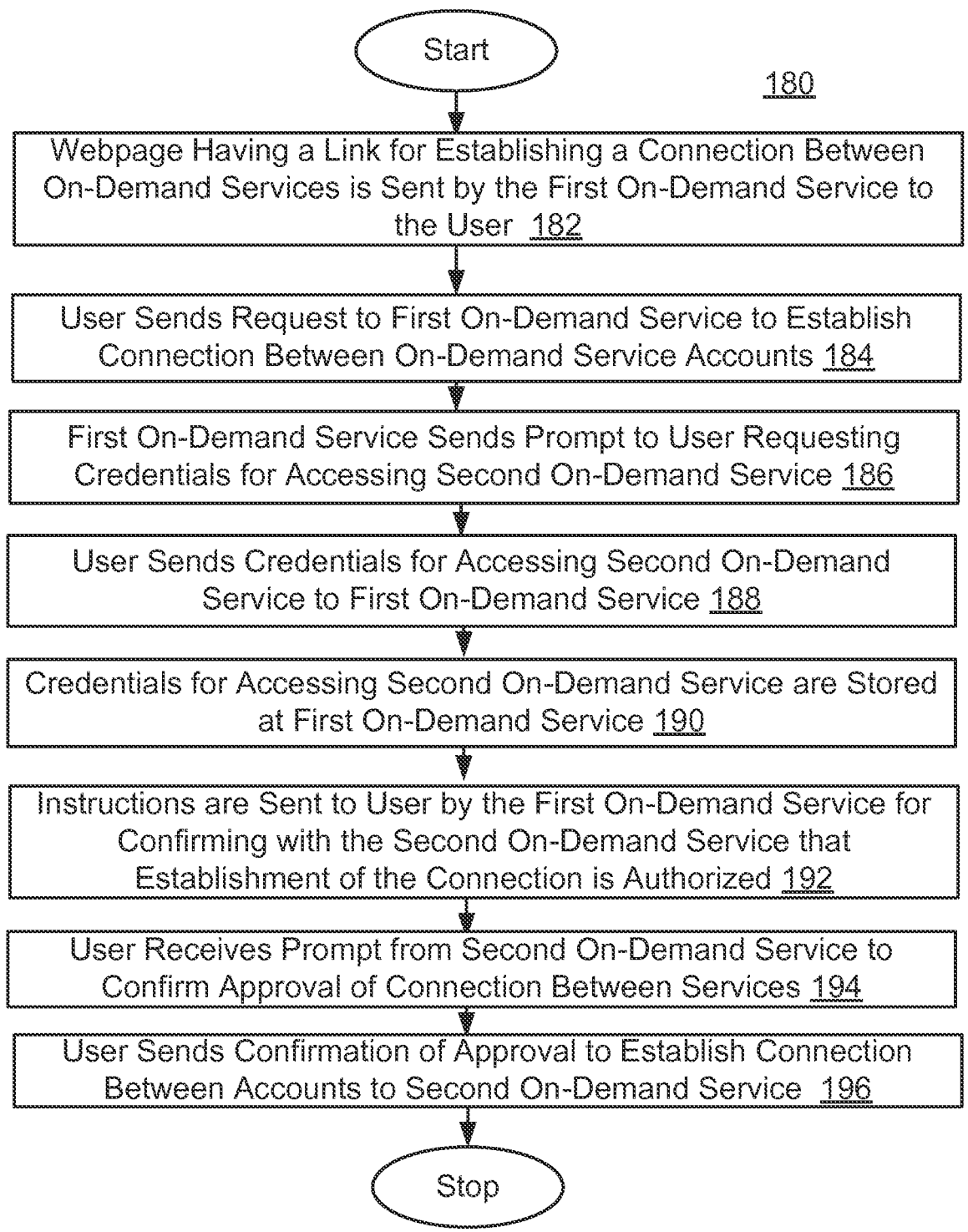
FIG. 1F shows a flowchart of an embodiment of a method for establishing a connection between on-demand service accounts.

FIG. 1F illustrates a flowchart of an embodiment of a client-side method 180 for establishing a connection between on-demand services for sharing documents and content. In step 182, a webpage having a link for establishing and/or utilizing a connection between on-demand services is sent to a user, which may be an administrator. The user is a user of the tenant and therefore a user of the on-demand service.

In step 184, the user sends a request to a first on-demand service to establish an association of between a user account at the first on-demand service and an account at a second on-demand service having documents, spreadsheets, photos, etc. to be shared with the first on-demand service. The user request may be sent from user system 12 (see FIGS. 1A and 1B). In step 186, the first on-demand service prompts the user to provide credentials for accessing the second on-demand service. In step 188, the user sends credentials for accessing the second on-demand service to the first on-demand service. In optional step 190, the credentials for accessing the second on-demand service are stored at the first on-demand service. In optional step 192, instructions are provided to the user for providing a confirmation to the second on-demand service that the establishment of the connection between the on-demand services is authorized. In optional step 194, the user receives a prompt from the second on-demand service to confirm that the establishment of the connection with the first on-demand service is authorized. In optional step 196, the user provides the second on-demand service with credentials associated with the second on-demand service and confirms that the establishment of the connection is authorized. In another embodiment, although depicted as distinct steps in FIG. 1F, steps 182-196 may not be distinct steps. In other embodiments, method 180 may not have all of the above steps and/or may have other steps in addition to or instead of those listed above. The steps of method 180 may be performed in another order. Subsets of the steps listed above as part of method 180 may be used to form their own method. For example, step 182 may form a method that is independent of the method of steps 184-196. For example step 182 may set up an initial connection to one or more on-demand services for which information was already preloaded into system 16, and for which accounts at other on-demand services are automatically created by the first on-demand service for use by the user, at the tenant's discretion.

Client-Side Setup Method for Sharing Documents Between On-Demand Services

Figure 2:
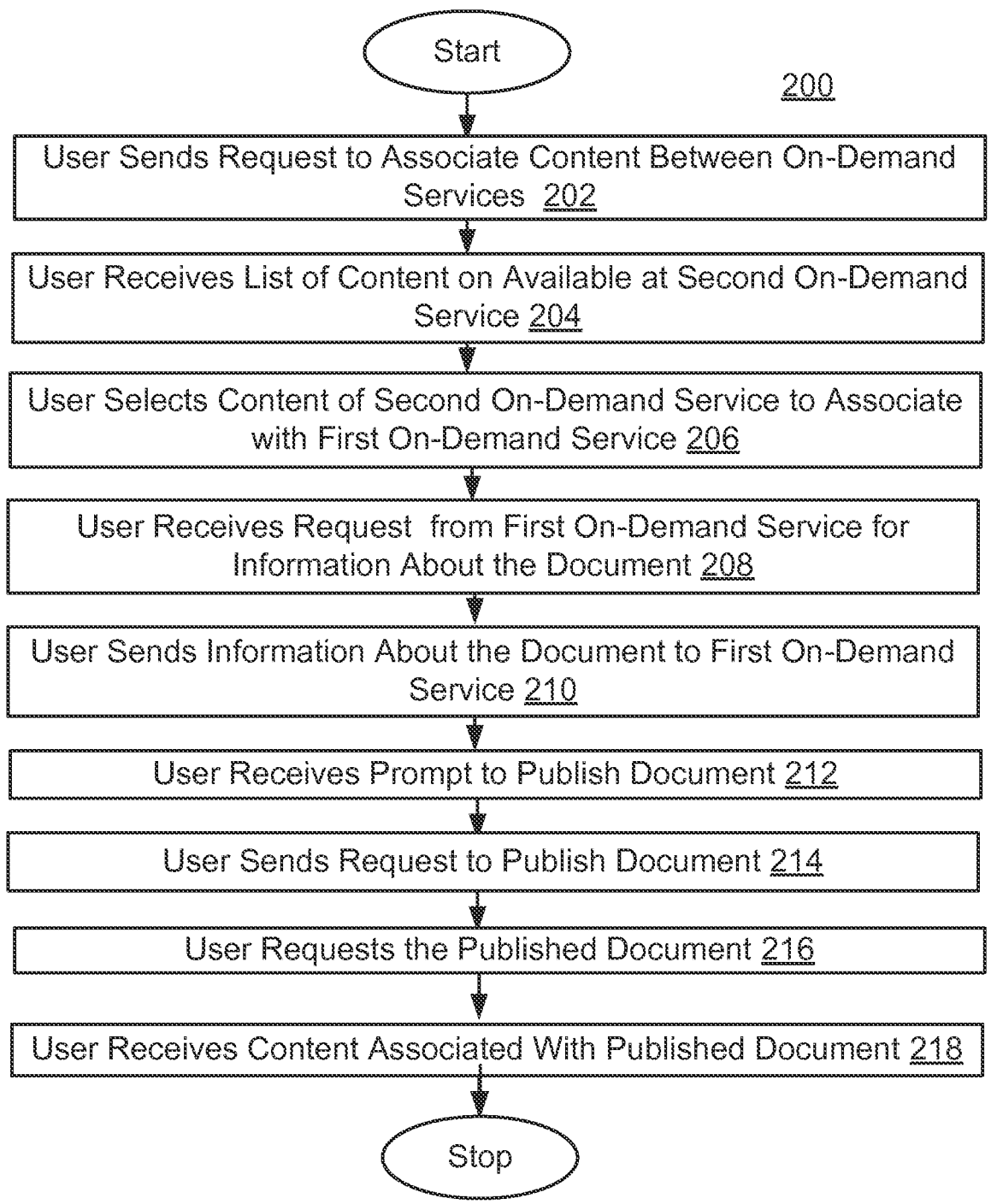
FIG. 2 illustrates a flowchart of an embodiment of a client-side method for establishing a link for sharing documents and content between on-demand services.

FIG. 2 illustrates a flowchart of an embodiment of a client-side method 200 for establishing a link for sharing documents and content between on-demand services. In step 202, a user, sends a request to a first on-demand service to establish an association of content (e.g., documents, spreadsheets, photos, etc.) from an application provided by a second on-demand service with data of the tenant stored at the first on-demand service. The user request may be sent from user system 12 (see FIGS. 1A and 1B). In step 204, in response to the user's request, the user receives an updated webpage (or other interface) having a list of content available for sharing between on-demand services. In step 206, the user makes a selection of one or more content items from the list of content available to be shared between on-demand services. In step 208, the user receives a prompt from the first on-demand service to provide information relevant to the one or more documents selected for sharing (e.g., tags, authorship, category, or workspace in which to place document, etc.). In step 210, the user sends the information relevant to the one or more documents to the first on-demand service. In step 212, the user is prompted to publish the one or more documents. In Step 214, the user sends a request to publish the one or more documents. In step 216, the user, or a user with sufficient access to the tenant's documents, requests the published document. In step 218, the user or user with sufficient access receives the published document.

Optionally, in step 204, a webpage (or other interface) is opened that facilitates establishing the link (e.g., a pointer or URL) without having to open the second on-demand database or the other of the two on-demand databases. Optionally in step 206, the user may select the requested content from a user interface (UI) of the first on-demand service via user system 12. In another embodiment, although depicted as distinct steps in FIG. 2, steps 202-218 may not be distinct steps. In other embodiments, method 200 may not have all of the above steps and/or may have other steps in addition to or instead of those listed above. The steps of method 200 may be performed in another order. Subsets of the steps listed above as part of method 200 may be used to form their own method. For example, steps 204 and 212 may form a method that is independent of the method of steps 200-218.

Server-Side Setup Method for Sharing Documents between On-Demand Services

Figure 3A:
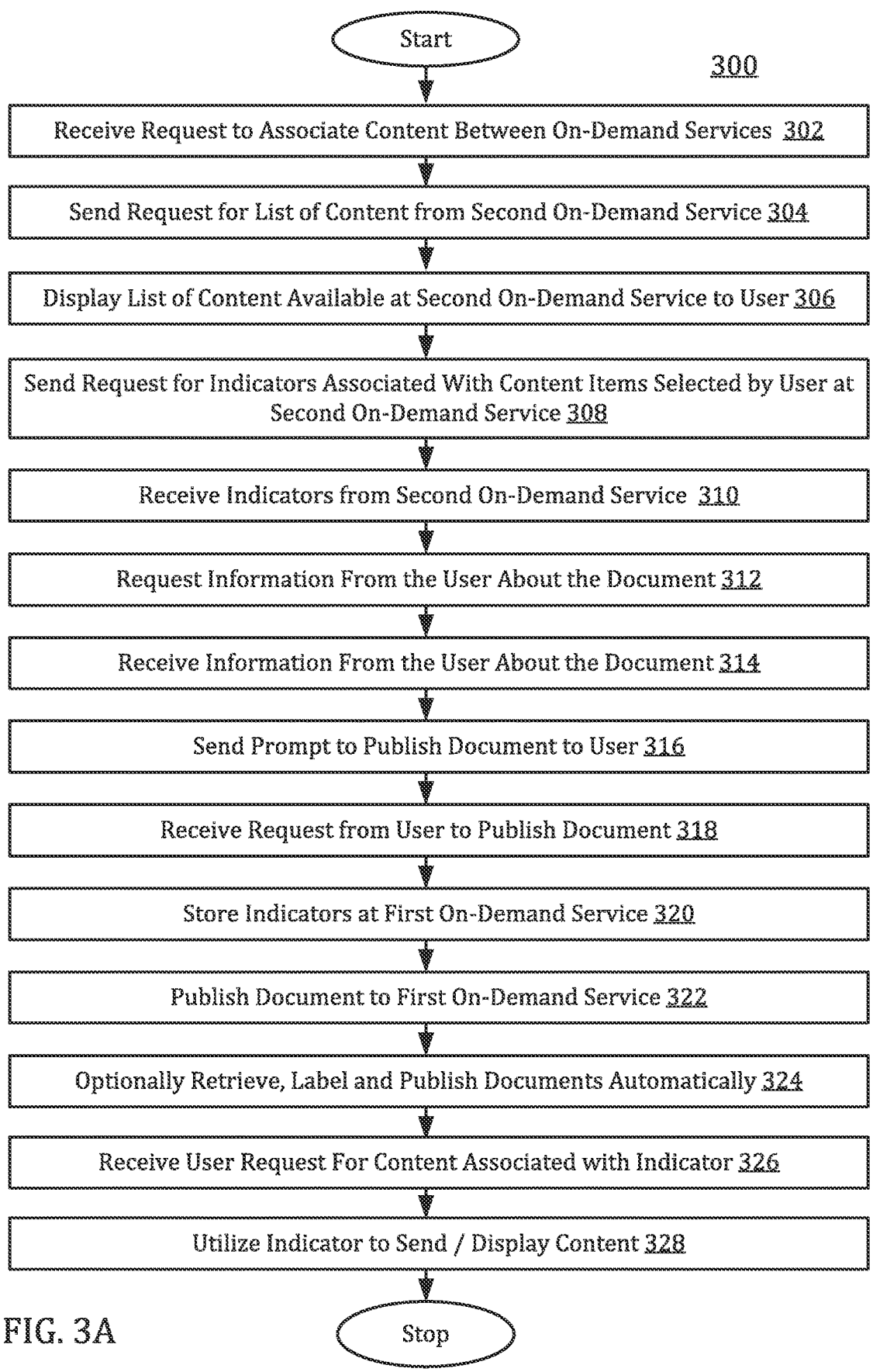
FIG. 3A illustrates a flowchart of an embodiment of a server-side method for establishing a link for sharing documents and content between on-demand services.

FIG. 3A illustrates a flowchart of an embodiment of a server-side method 300 for establishing a link for sharing documents and content between on-demand services. In step 302, a selection request is received from a user, by a first on-demand service to establish an association of content (e.g., documents, spreadsheets, photos, etc.) from an application provided by a second on-demand service with data of the tenant stored at the first on-demand service. The user request may be received from user system 12 (see FIGS. 1A and 1B). In step 304, the first on-demand service sends a request to the second on-demand service for a list of documents available at the second on-demand service. In step 306, the list of documents available at the second on-demand service is displayed to the user.

In step 308, the first on-demand service sends a request to the second on-demand service for indicators (e.g., links) associated with a user's selection of documents to be shared with the first on-demand service. In step 310, the first on-demand service receives one or more indicators corresponding to the one or more documents to be shared between on-demand services. In step 312, the first on-demand service sends a request to the user to provide information relevant to the one or more documents selected for sharing (e.g., tags, authorship, category, or workspace in which to place document, etc.). In step 314, information relevant to one or more documents is received from the user at the first on-demand service. In step 316, the first on-demand service sends a prompt to publish one or more documents to a user. In Step 318, the first on-demand service receives a request to publish one or more documents from the user. In step 320, the indicators associated with the documents selected from the second on-demand service are stored at the first on-demand service. In step 322, the information and indicators associated with documents of the second on-demand service are published to the first on-demand service, and an indication (e.g., a notification) is sent to the user to notify the user that an indicator is stored at the first on-demand service. For example, the user may receive a copy of the webpage (or other interface) having the indicator. The indicator may include a link that opens a webpage for locating and/or retrieving the content of the second on-demand service or application. In optional step 324, the selection of one or more content items (e.g., documents) from the second on-demand service, the labeling and the publication of the selected documents is performed automatically at the first on-demand service, and includes all documents stored in one or more locations (e.g., folders) at the second on-demand service.

In step 326, a request for a shared document is received from the at the first on-demand service. In step 328, the first on-demand service utilizes the indicator associated with the shared document requested in step 326 to provide the requested document.

Optionally in step 304, a webpage (or other interface) is opened that facilitates establishing the link (e.g., a pointer) without having to open the second on-demand database or the other of the two on-demand databases.

Optionally, in step 322, in response to the user's request, an indicator is stored at the first on-demand service. The indicator may include a link that opens a webpage for locating the content of the second on-demand service or application, and for placing the content into a content storage area of the first on-demand service. In step 306, in response to the user selecting the requested content from a user interface (UI) of the first on-demand service, via user system 12, the content is sent to the user. In another embodiment, although depicted as distinct steps in FIG. 3, steps 302-306 may not be distinct steps. In other embodiments, method 300 may not have all of the above steps and/or may have other steps in addition to or instead of those listed above. The steps of method 300 may be performed in another order. Subsets of the steps listed above as part of method 300 may be used to form their own method. For example, steps 304 and 306 may form a method that is independent of the method of steps 300-306.

Client Side Method of Sharing Content

Figure 3B:
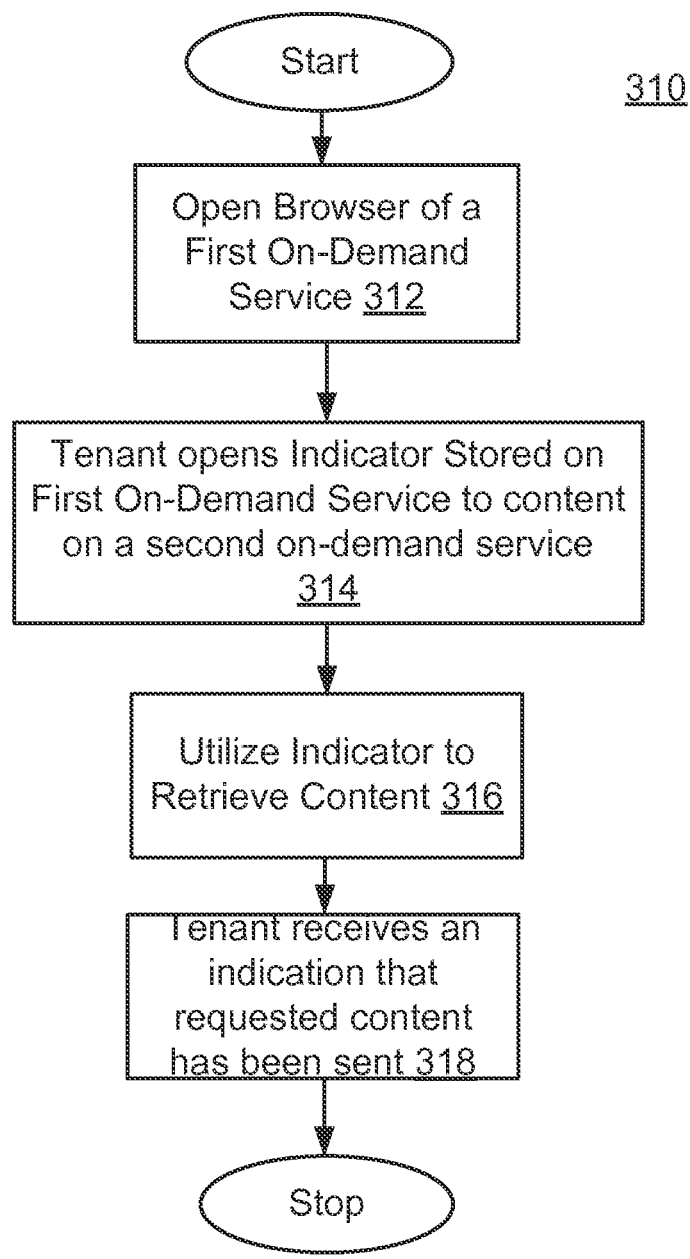
FIG. 3B illustrates a flowchart of an embodiment of a client side method of using the link established via the method of FIGS. 2 and 3A.

FIG. 3B illustrates a flowchart of an embodiment of a client side method 310 of using the link established via the method of FIGS. 2 and 3A. In step 312, a user opens HTTP Client 12F to access a first on-demand service, or otherwise accesses a first on-demand service. The user may open HTTP Client 12F from user system 12 (see FIGS. 1A and 1B). In step 314, the user selects or opens a link to a second on-demand service, where the link is stored at the first on-demand service, system 16. The link may open a webpage displaying the content that is stored within the second on-demand service. In an embodiment, a login page is first presented to the user to login to the second on-demand service, unless the user is already logged in to the second on-demand service. In another embodiment, even if the user is not already logged in, system 16 automatically logs the user into the second on-demand service. In an embodiment, the user is presented with a page containing a mixture of documents, some of the documents being stored on and/or otherwise originating from the other on-demand service, while other documents are unrelated to the other on-demand service. In an embodiment, the user may choose content from the second on-demand service for placing the content into a content storage area of the first on-demand service so that the content is available at system 16. In step 316, the user selects content to be obtained from the second on-demand service via a user interface (UI) of the first on-demand service, via user system 12. In step 318, the user receives an indication that the selected content has been sent from the second on-demand service to the first on-demand service of the user. Optionally in step 314, when activating a link, a webpage (or other interface) is opened that facilitates establishing the link (e.g., a pointer) without having to open the second on-demand database or the other of the two on-demand databases.

In another embodiment, although depicted as distinct steps in FIG. 3B, steps 312-318 may not be distinct steps. In other embodiments, method 310 may not have all of the above steps and/or may have other steps in addition to or instead of those listed above. The steps of method 310 may be performed in another order. Subsets of the steps listed above as part of method 310 may be used to form their own method. For example, steps 312 and 314 may form a method that is independent of the method of steps 312-318 of using the link established via the method of FIGS. 2 and 3A.

Server Side Method of Sharing Content

Figure 3C:
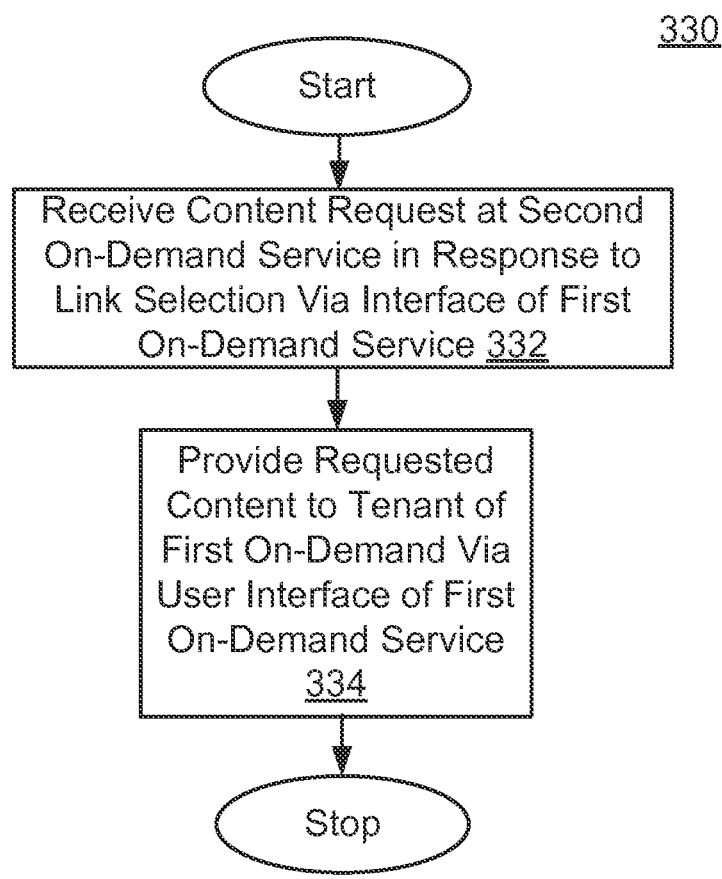
FIG. 3C illustrates a flowchart of an embodiment of a server side method of using the link established via the method of FIGS. 2 and 3A.

FIG. 3C illustrates a flowchart of an embodiment of a server side method 330 of using the link established via the method of FIGS. 2 and 3A. In step 332, the first on-demand service receives a content request in response to a user's link selection. In step 334, the first on-demand service forwards the content request to a second on-demand service that has the requested content. In step 336, the first on-demand service receives the requested content from the second on-demand service. In step 338, the first on-demand service provides the requested content to the user via a user interface of the first on-demand service. In another embodiment, although depicted as distinct steps in FIG. 3C, steps 332-338 may not be distinct steps.

In other embodiments, method 330 may not have all of the above steps and/or may have other steps in addition to or instead of those listed above. The steps of method 330 may be performed in another order. Subsets of the steps listed above as part of method 330 may be used to form their own method. For example, steps 332 and 334 may form a method that is independent of the method of steps 332-338.

Second On-Demand Service Method of Sharing Content

Figure 3D:
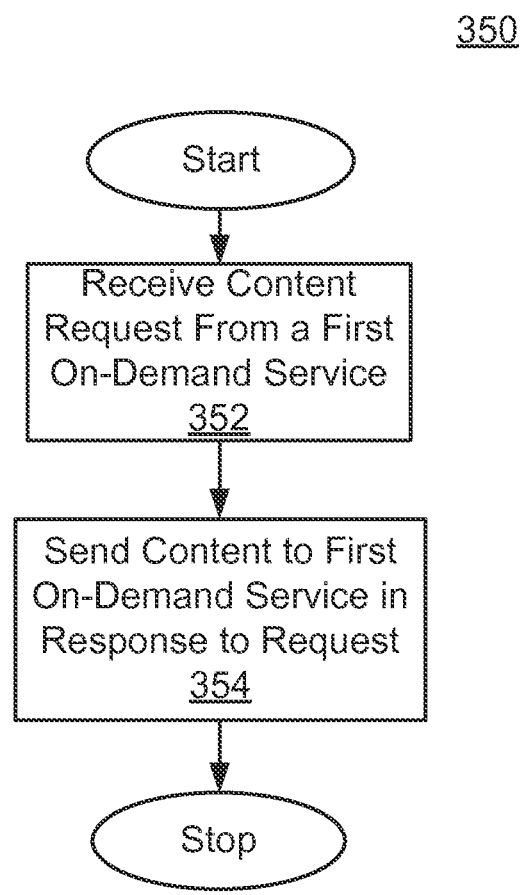
FIG. 3D illustrates a flowchart of an embodiment of the response of an on-demand service such as Google Docs to the usage of the link established via the method of FIGS. 2 and 3A.

FIG. 3D illustrates a flowchart of a method embodiment 350 of the response of a second on-demand service such as Google Docs to the usage of the link established via the method of FIGS. 2 and 3A. In step 352, a second on-demand service receives a request for content stored by the second on-demand service from a first on-demand service. In step 354, in response to the content request from the first on-demand service, the second on-demand service sends the requested content to the first on-demand service.

In another embodiment, although depicted as distinct steps in FIG. 3D, steps 352-354 may not be distinct steps. In other embodiments, method 350 may not have all of the above steps and/or may have other steps in addition to or instead of those listed above. The steps of method 350 may be performed in another order. Subsets of the steps listed above as part of method 330 may be used to form their own method. For example, step 352 may form a method that is independent of the method of steps 352-354.

Screenshots

Figure 4:
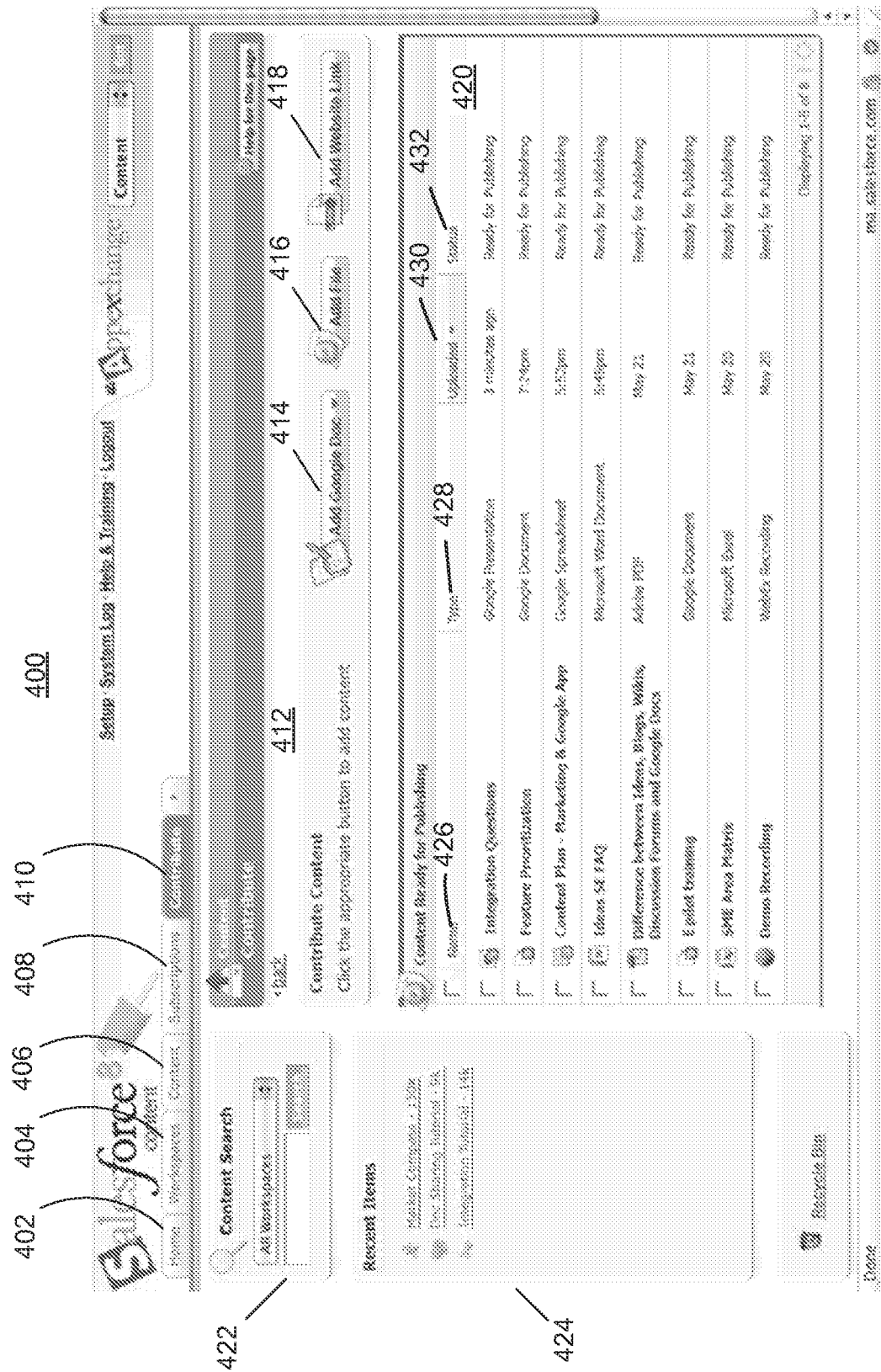
FIG. 4 shows screenshot of a contribute page of an on-demand service with an example of a "Content Ready for Publishing" queue for publishing and sharing documents, in which some of the documents in the queue are linked to another website of a separate on-demand service(s) (in this example Google®)

FIG. 4 shows screenshot of a contribute page 400 of an on-demand service with an example of a "Content Ready for Publishing" queue 418 for publishing and sharing documents, in which some of the documents in the queue are linked to another website of a separate on-demand service(s) (in this example Google®). Contribute page 400 may include home tab 402, workspace tab 404, content tab 406, subscriptions tab 408, and a contribute tab 410. The contribute page may also include a content contribution source selection area 412, add document button 414 (shown as Add Google Doc in example), add file button 416, and add website link button 418, the content ready for publishing queue 420, a content search area 422, and a recent items area 424. In other embodiments, the contribute page 400 may not have all of the elements listed and/or may have other elements instead of or in addition to those listed.

The contribute page 400 provides a user with information on the documents that are available for publishing. The home tab 402 is a tab that brings a user to a homepage (not shown) of the user's on-demand service. The workspace tab 404 is a tab that brings a user to a list of workspaces (not shown) within the user's on-demand service, which the user may select. The content tab 406 is a tab that allows the user to view content that has already been published. The subscriptions tab 408 brings the user to a webpage that allows the user to initiate and/or modify a subscription to documents and/or other items within system data storage 24 (see FIG. 1A). The contribute tab 410 is highlighted and presently selected by the user to display the contribute content area 412. Within the contribute content area 412, the add document button 414 (shown as Add Google Doc in the example of FIG. 4), add file button 416, and add website link button 418 maybe used to add or share content between on-demand services. Specifically, add document button 414 may be used for adding documents, add file button 416 may be used for adding files, and add website link button 418 may be used for adding a link to a website. Add document button 414 may be configured to add documents from a specific predetermined on-demand system, such as Google® or Yahoo!®. In an embodiment, there may be multiple add document buttons in which each document button is configured for a different on-demand service.

Continuing with FIG. 4, the content ready for publishing queue 420 is organized into columns, and provides a listing by name 426 of content ready for publishing in a list that provides the type of content 428 (i.e., Google content, Microsoft based content, Adobe based content, etc.), a chronology of when the content was uploaded to the on-demand service 430, and the content's status 432 with respect to the availability of the content for publishing. The content search area 422 includes one or more links and/or fields that allow a user to formulate a search query of their on-demand service. The recent items area 424 lists content and items that have been recently accessed by the user.

Figure 5:
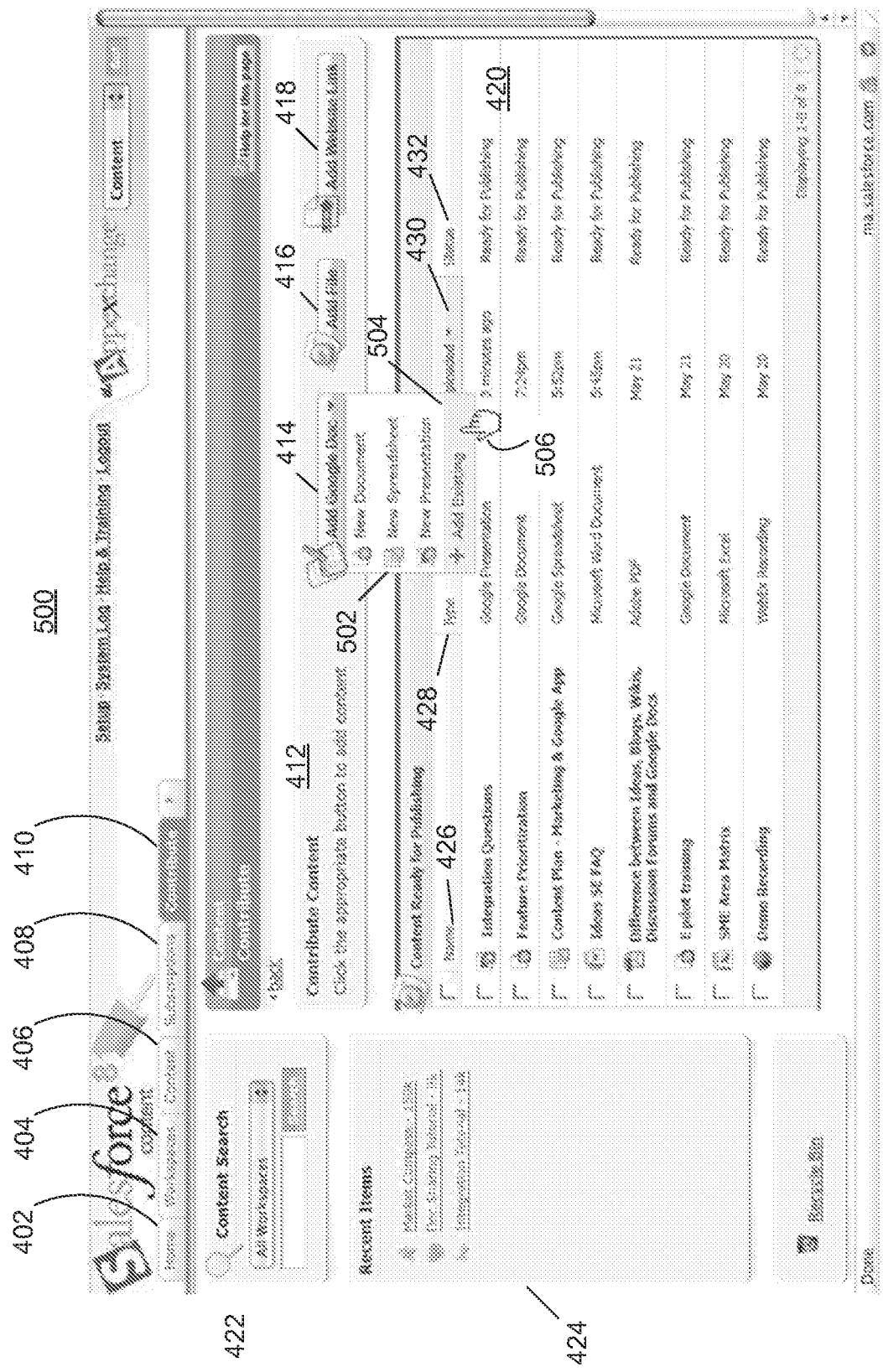
FIG. 5 shows a screenshot of a contribute page of an on-demand service with an example of selecting a menu button revealing the "Add Google Doc" menu, which enables users to add documents from another on-demand website (in this example Google®)

FIG. 5 is a screenshot of an example of a contribute page 500, which is related to contribute page 400. The contribute page 500 may include home tab 402, workspace tab 404, content tab 406, subscriptions tab 408, and a contribute tab 410. The contribute page may also include a content contribution source selection area 412, add document button 414 (shown as Add Google Doc in the example), add file button 416, and add website link button 418, the content ready for publishing queue 420, a content search area 422, and a recent items area 424, which were described in conjunction with FIG. 4, above. Contribute page 500 may also include pull down menu 502, existing document 504, and cursor 506. In other embodiments, the contribute page 500 may not have all of the elements listed and/or may have other elements instead of or in addition to those listed.

Continuing with the screenshot of FIG. 5, the contribute page 500 of an on-demand service has an example of a user selecting an add document button 414, in the form of an "Add Google Doc" to reveal the add content from another on-demand service pull down menu 502, which enables users to add documents from another on-demand website (in this example Google®). The pull down menu 502, of the present example, provides the user with the option of adding a new document, a new spreadsheet, a new presentation, or an existing document 504. In the example of FIG. 5, the option for adding an existing document 504 is highlighted since a cursor 506 is positioned over the add existing document 504 selection in the pull down menu 502.

Figure 6:
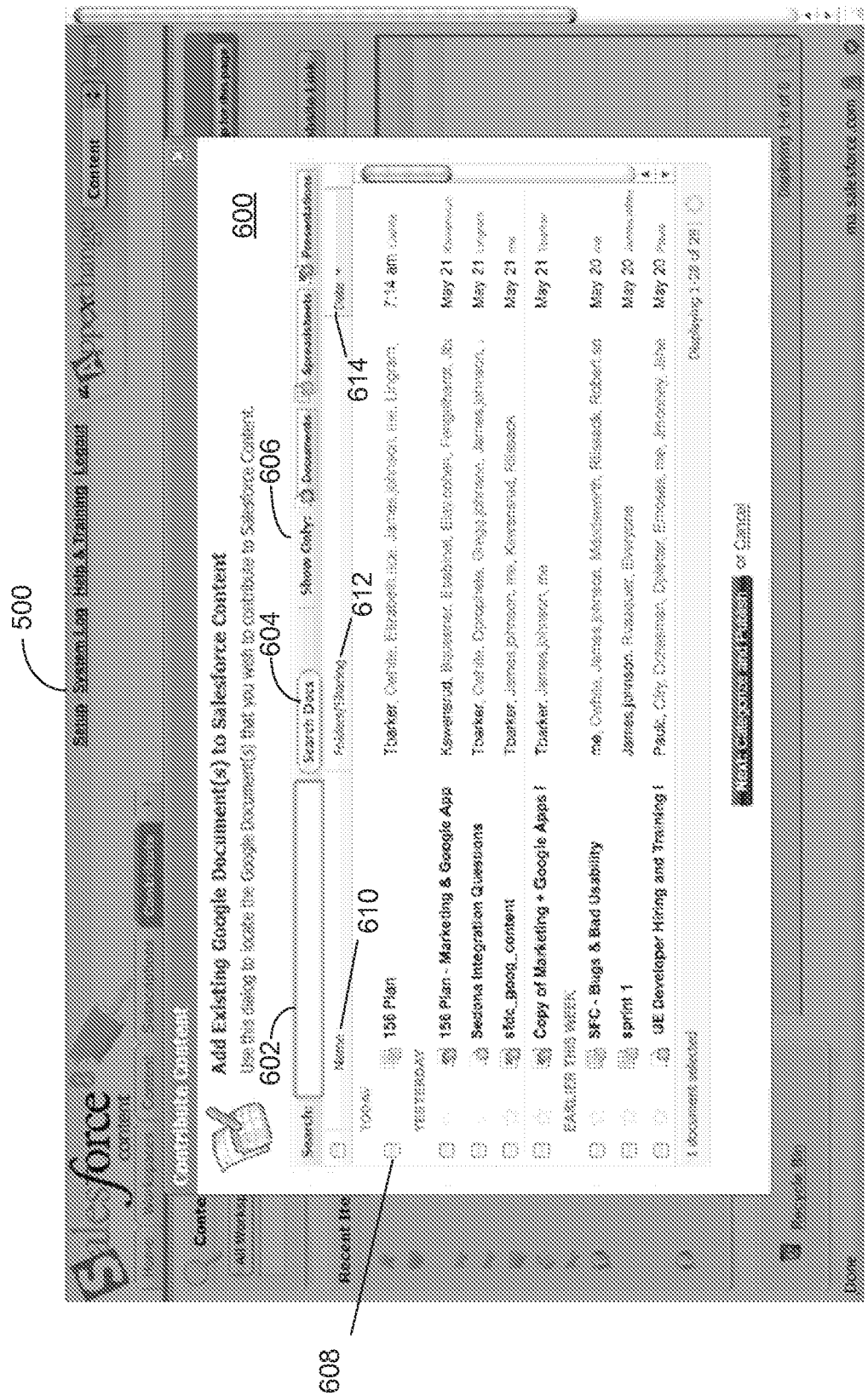
FIG. 6 shows a screenshot of an example of a contribute content overlay interface for listing, searching, and filtering a list of documents on other on-demand service websites, and for establishing a link within the user's on-demand website to the content in the other website.

FIG. 6 shows a screenshot of an example of a contribute content overlay interface 600 for listing, searching, and filtering a list of documents and content on other on-demand service websites, and for establishing a link within the user's on-demand website to the content in the other website. The contribute content overlay interface 600 may include an entry field 602, a search button 604, filter parameters 606, and a listing of available content 608. The listing of available content 608 may be organized into columns by name of content 610, folder sharing access rights 612, and date of contribution 614. Furthermore, groups of content may be formed based on their chronological period of contribution, for example today, yesterday, earlier this week, etc. In other embodiments, the contribute content overlay interface 600 may not have all of the elements listed and/or may have other elements instead of or in addition to those listed.

Continuing with FIG. 6, the contribute content overlay interface 600 appears above the contribute page 500 in response to the user's selection of the option of adding existing content 504 from the pull down menu 502. In the present example, the existing content is found in the Google® on-demand service. However additional on-demand services may also be accessed. The entry field 602 is utilized for conducting searches of available content on a selected on-demand (in this example Google®). A search is initiated after the entry of search parameters into the entry field 602, and a user clicks on the search button 604. Filter parameters 606, which may include content types such as documents, spreadsheets, and presentations, serve to target the search results to content the user wants to contribute to their on-demand service.

Figure 7:
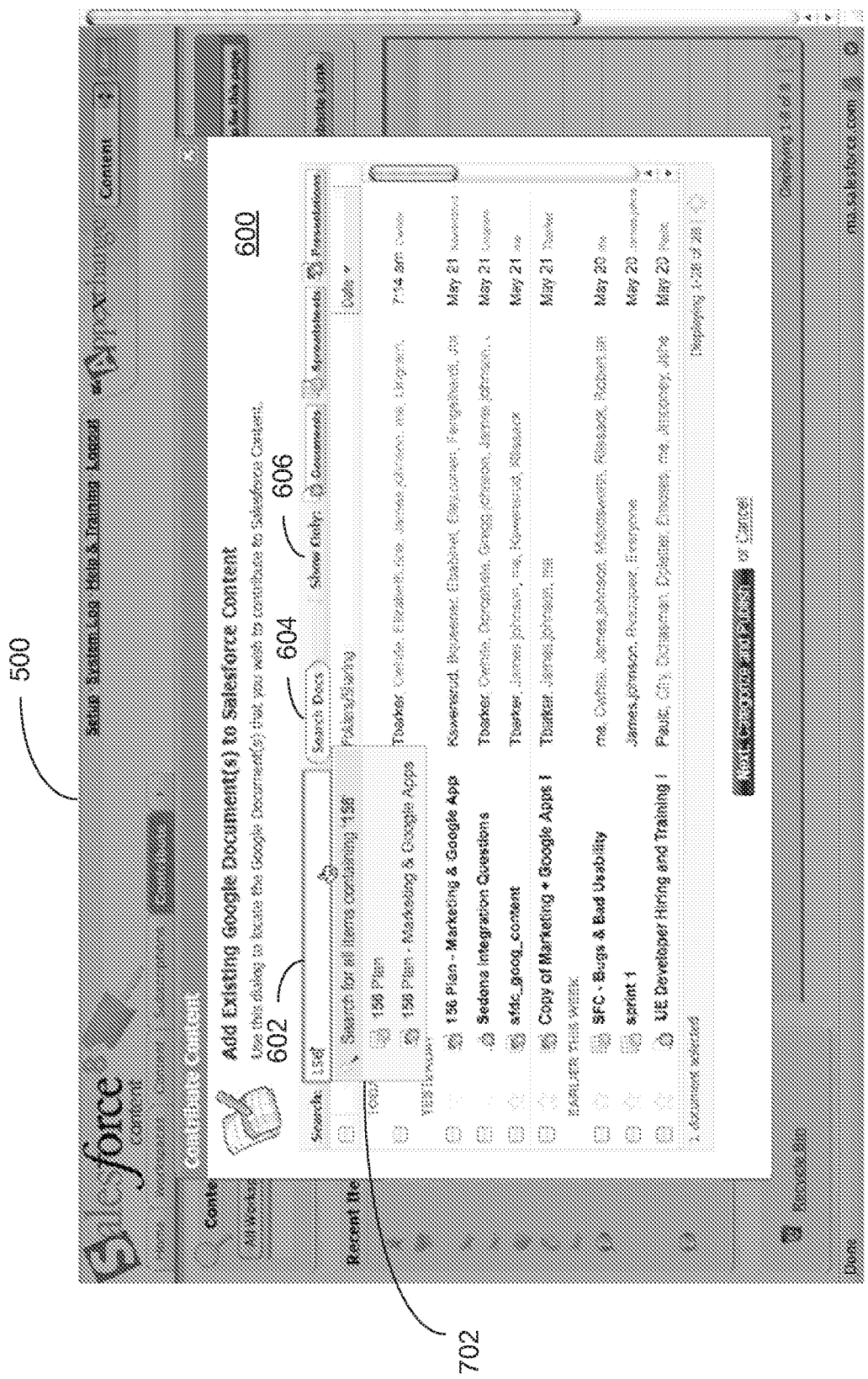
FIG. 7 shows a screenshot of a contribute page with an example of the overlay interface of FIG. 6 with a search string entered into the search box.
Figure 8:
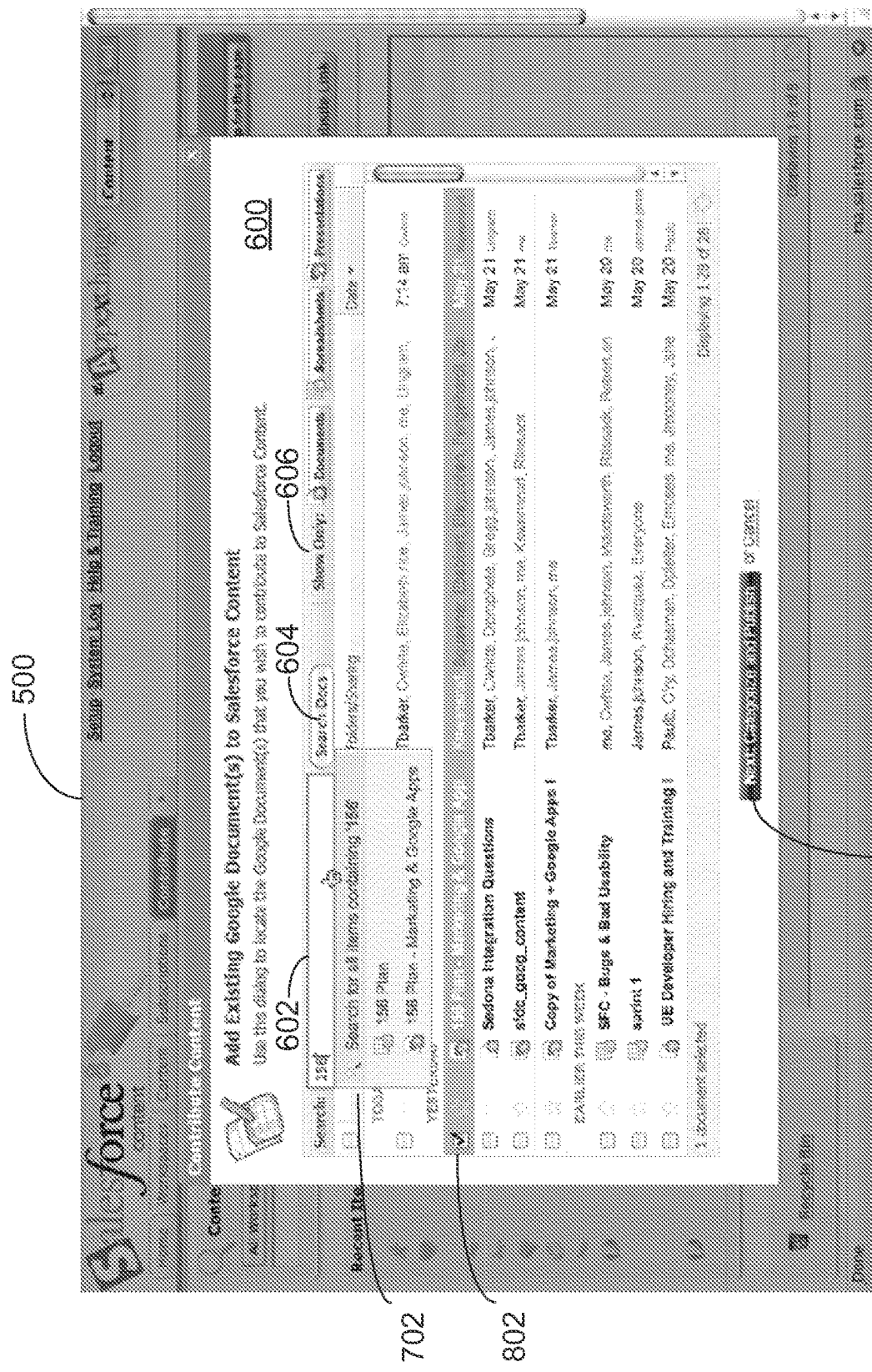
FIG. 8 shows a screenshot of an example of the overlay interface of FIG. 6 with one of the documents found being selected by checking a box next to the document.

FIGS. 7 and 8 show screenshots of examples of contribute content overlay interface pages 700 and 800 respectively, which are related to contribute content overlay interface 600. Contribute content overlay interface pages 700 and 800 may each include an entry field 602, a search button 604, filter parameters 606, and a listing of available content 608. Entry field 602, search button 604, filter parameters 606, and a listing of available content 608 were described in conjunction with FIG. 6, above.

FIG. 7 shows a screenshot of a contribute page 500 with an example of the contribute content overlay interface 600 of FIG. 6 with a search string entered into the entry field 602 (in addition to the elements discussed above that are common to FIGS. 5-8). FIG. 7 also shows auto-complete drop down menu 702. In other embodiments, the contribute content overlay interface 700 may not have all of the elements listed and/or may have other elements instead of or in addition to those listed.

Continuing with FIG. 7, in response to a user entering a search string or a portion of a search string in the entry field 602, an auto-complete drop down menu 702 appears with content that relates to the entered search string. In the present example, the user begins to type in the search string "156" in entry field 602, and in response the auto-complete drop down menu 702 appears with content that relates to the entered search string "156", such as "156 Plan" and "156 Plan—Marketing & Google Apps," for example.

FIG. 8 shows a screenshot of a contribute page 500 with an example of the contribute content overlay interface 600 of FIG. 6 with one of the documents found in a search being selected by checking a box 802 next to the document (in addition to the elements discussed above that are common to FIGS. 5-8). In other embodiments, the contribute content overlay interface 800 may not have all of the elements listed and/or may have other elements instead of or in addition to those listed.

Following the selection of content by the user, by checking off one or more selection boxes (box 802 in the present example), the selected content is now ready to be added from the on-demand service (in this example Google®) to the user's on-demand service (in this example Salesforce) upon the user clicking (selecting) the publish button 804.

Figure 9:
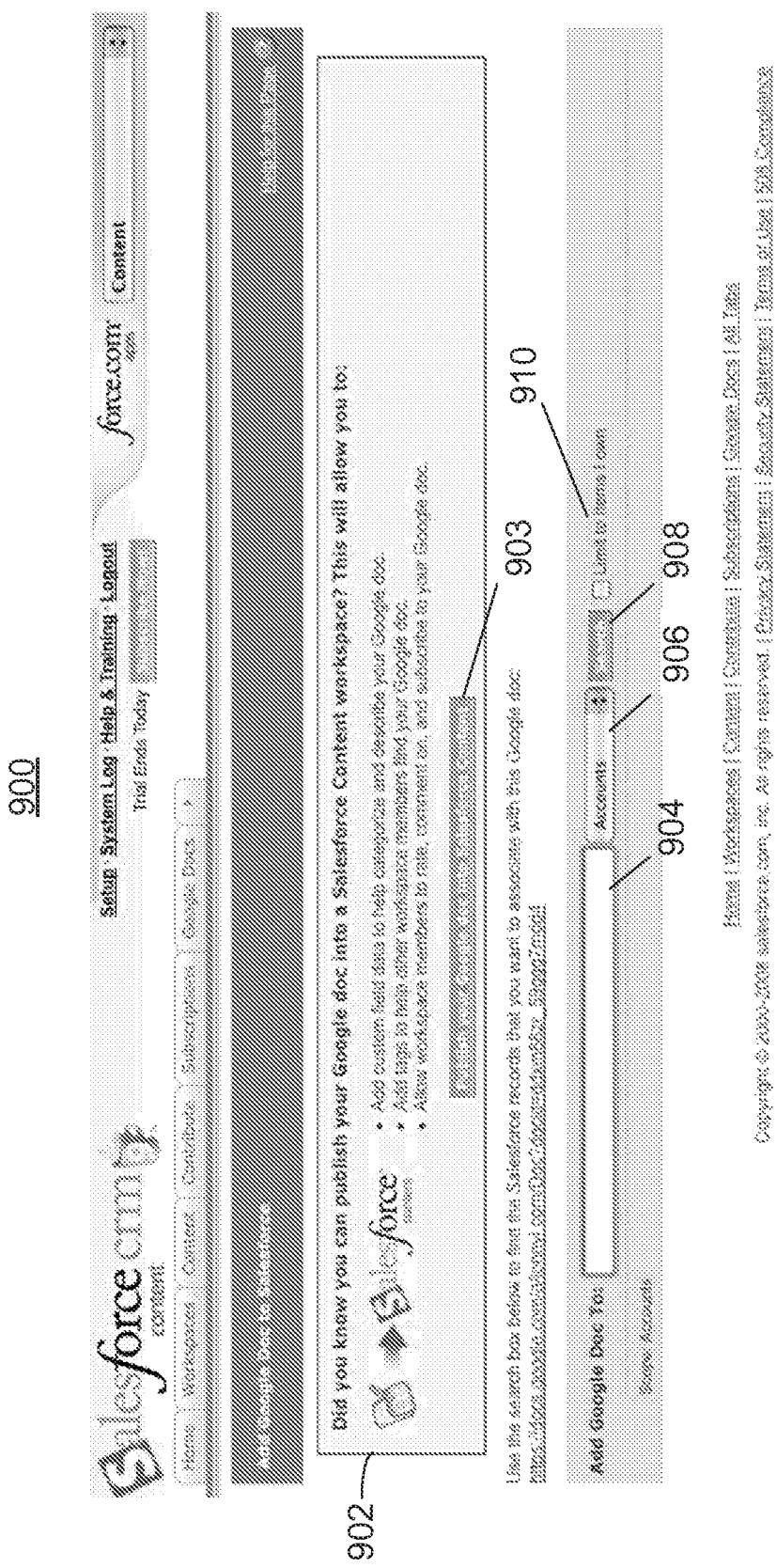
FIG. 9 shows a screenshot of an example of a new documents interface for adding a document in a second on-demand service to documents in a first on-demand service.

FIG. 9 shows a screenshot of an example of a new documents interface 900 for adding a document in a first on-demand service to documents in a second on-demand service. New interface 900 may include informational content 902, publish button 903, selection field 904, accounts menu 906, search box 908, and limit items box 910. In other embodiments, new document interface 900 may not have all of the elements listed and/or may have other elements instead of or in addition to those listed.

Continuing with FIG. 9, the user is brought to new document interface 900 as a result of selecting new document from pull down menu 502 (FIG. 5). In the example of FIG. 9, the informational content 902 informs a user that they may publish documents that are in another on-demand service to their current on-demand service. For example, informational content 902 may state that the user may publish their Google® doc (or other content from an on-demand service) to a workspace of their on-demand service, thereby allowing the following: add custom field data to help categorize and describe content, add tags to help other workspace members find content, and allow workspace members to rate, comment on, and subscribe to the user's content. Selecting publish button 903 causes the document that is specified to publish. Selection field 904 allows the user to enter the location of the new document that the user would like to publish. Account menu 906 allows the administrator to select an account in which the user is associated with to which the add documents feature is added. Search 908 allows the user to search for a user or account to which to add documents feature. Limit box 910 allows the user to limit the search to documents that the user owns.

Figure 10:
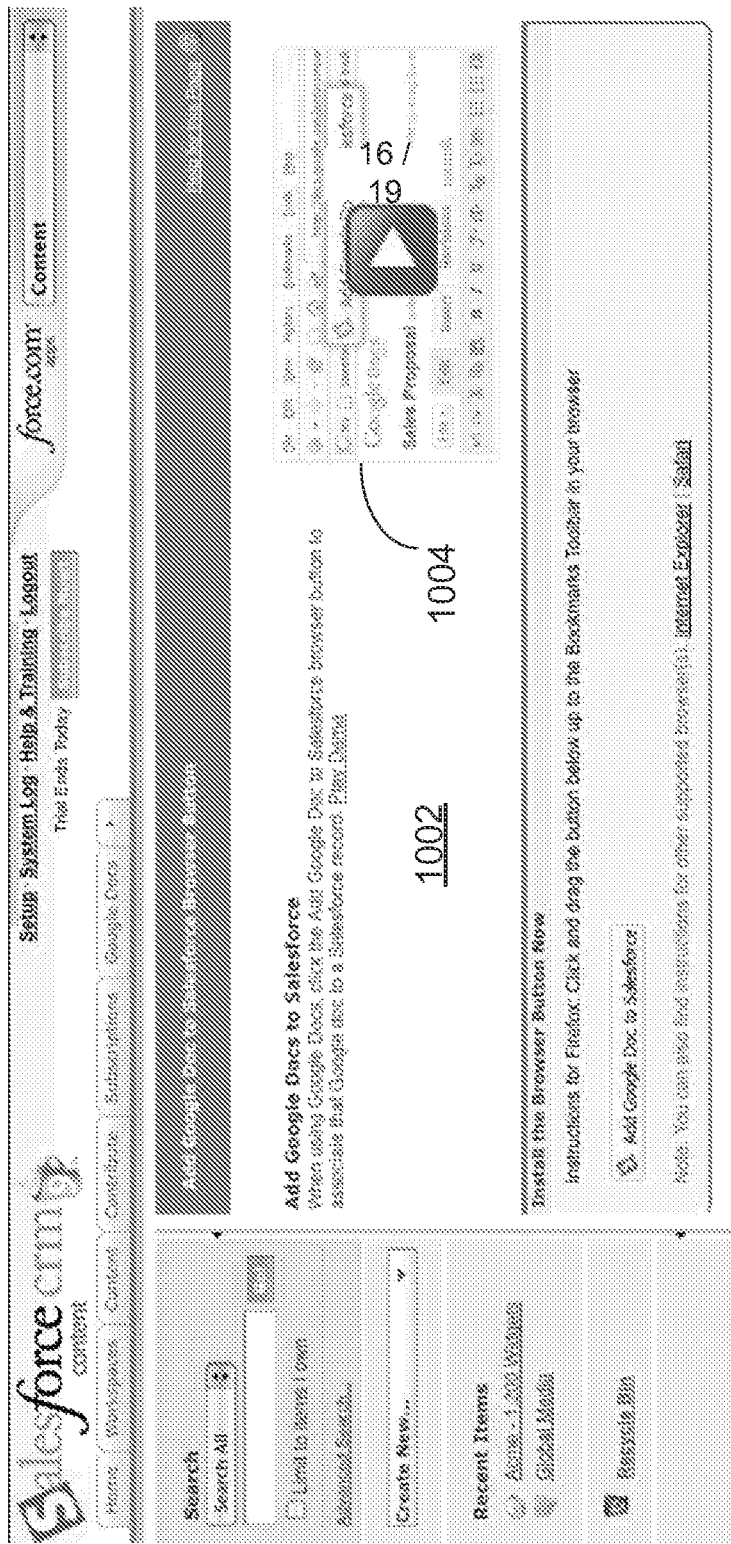
FIG. 10 shows a screenshot of an example of an informational interface for adding a browser button to the browser of a user of a first on-demand service's page, which when activated allows the viewing and retrieving of information stored at a second on-demand service via the first on-demand service.

FIG. 10 shows a screenshot 1000 of an example of an informational interface 1002 for adding a browser button to a first on-demand service's page, which when activated allows the viewing and retrieving of information stored at a second on-demand service.

In the example of FIG. 10, the informational interface 1002 informs a user that they may add on-demand content (in this example Google® docs) to their own on-demand service (in this example Salesforce). The user is instructed to click or select the add Google® doc to Salesforce browser button to associate that Google® doc to a Salesforce record. A demonstration video 1004 explaining how to add on-demand content is also provided.

Figure 11:
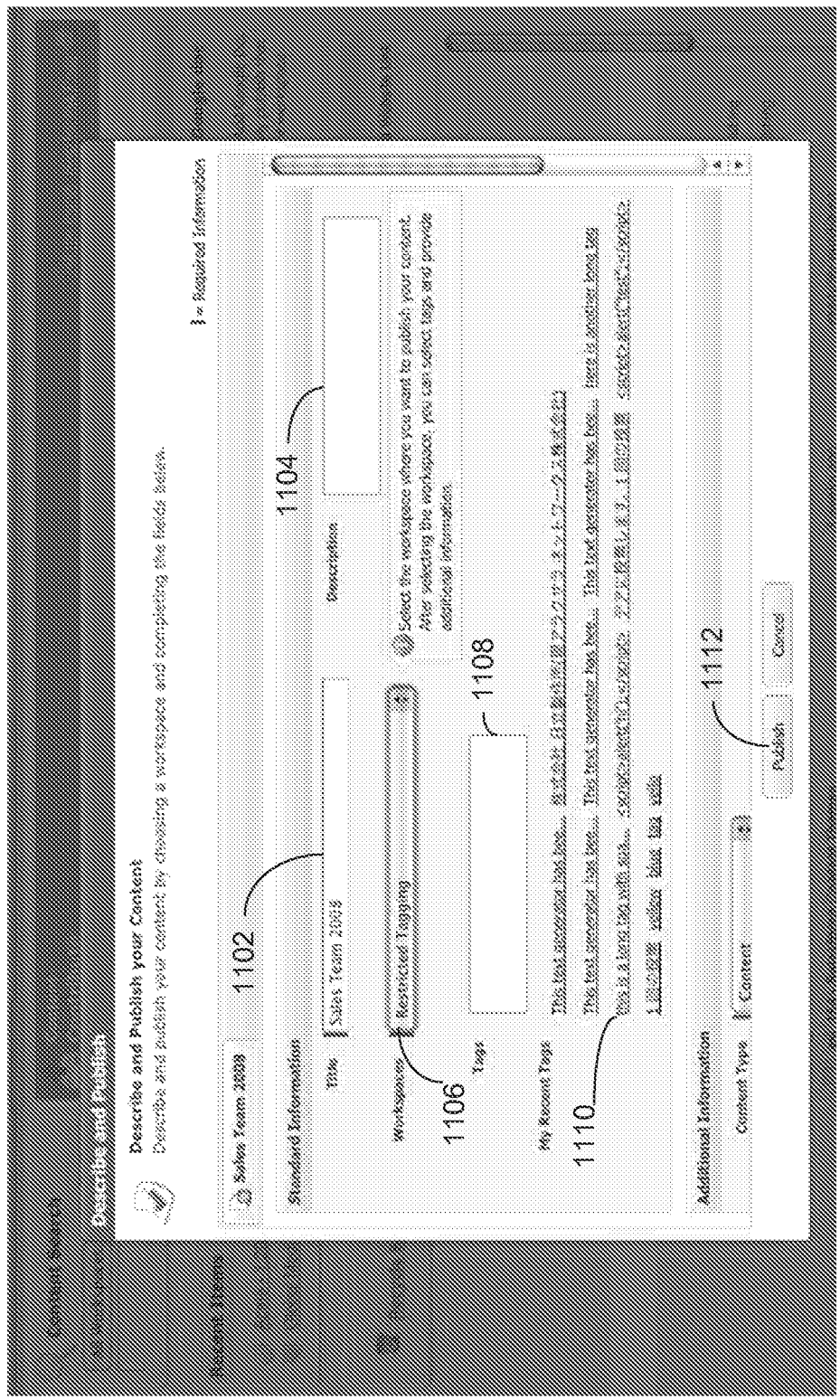
FIG. 11 shows a screenshot of an example of an interface for entering information to describe (tag) a document or link to a document, such as one retrieved from or linking to another on-demand service, prior to publishing the document or link.

FIG. 11 shows a screenshot of an example of a describe and publish interface 1100 for entering information to describe (tag) a document or link to a document, such as one retrieved from or linking to another on-demand service, prior to publishing the document or link. The describe and publish interface may include a title entry field 1102, a description field 1104, a workspace selection field 1106, a tagging field 1108, a tag list 1110, and a publish button 1112. In other embodiments, the describe and publish interface 1100 may not have all of the elements listed and/or may have other elements instead of or in addition to those listed.

A user utilizes the describe and publish interface 1100 for posting content to a workspace in an on-demand service. The user is brought to publish interface 1100 by selecting publish button 903 (FIG. 9). The user may choose descriptors for the content that they are publishing, including a title, which is entered in the title entry field 1102, a description of the content, which is entered in the description field 1104, and one or more tags, which are entered in the tagging field 1108. A list of recently used tags 1110 assists the user in assigning tags to the content to be published. In the event the user is ready to publish their content, the user clicks on the publish button 1112 to post the content FIGS. 12A-12L show a sequence of screenshots for creating or locating a document in a second on-demand service from the workspace of a first on-demand service according to an embodiment of the invention.

Figure 12A:
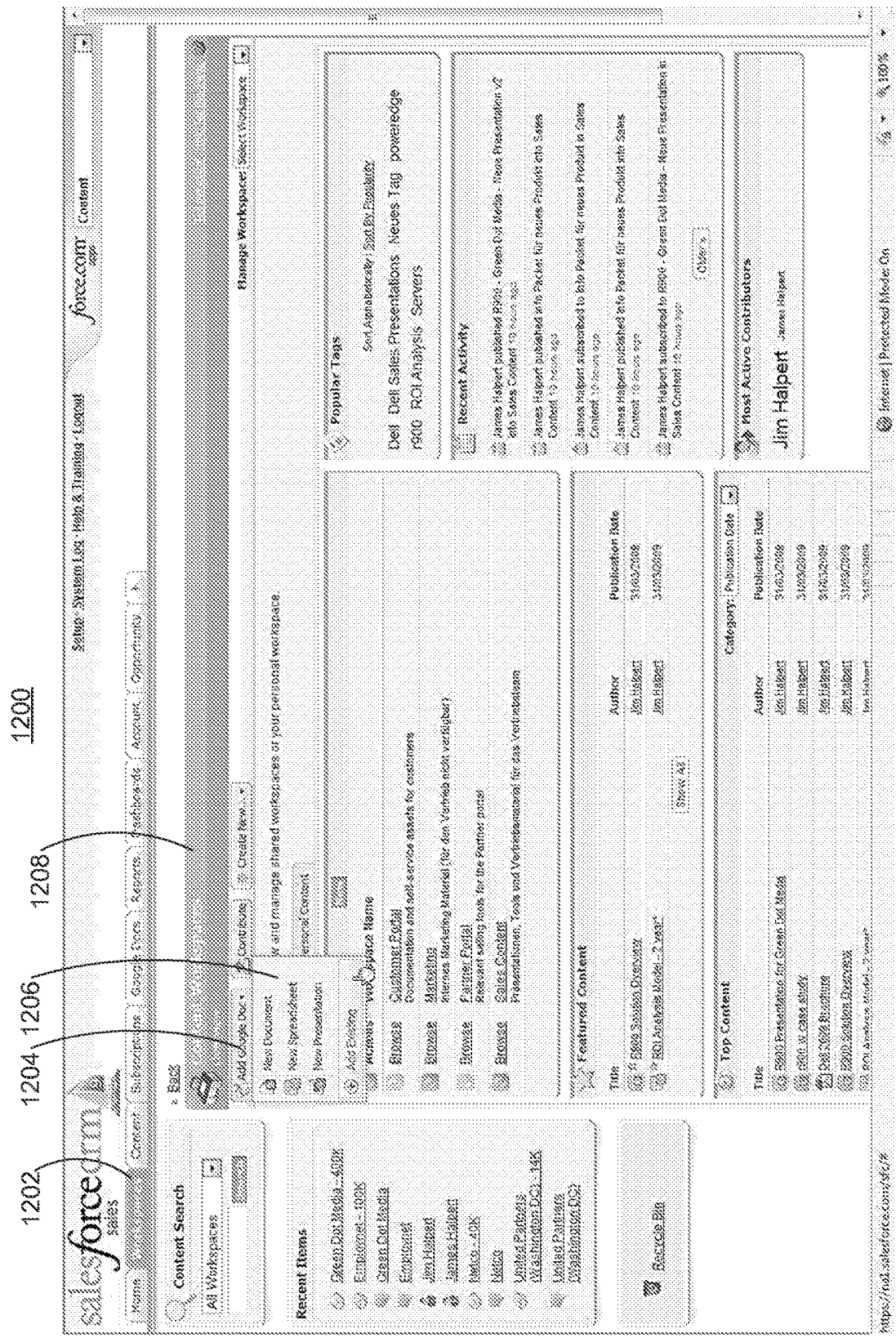
FIGS. 12A-12L show a sequence of screenshots for creating or locating a document in a second on-demand service from the workspace of a first on-demand service according to an embodiment of the invention.

FIG. 12A shows a screenshot of a workspace page 1200 with the workspace tab 1202 selected to display a content workspaces overview 1208 of a first on-demand service (in the present example Salesforce). In response to the selection of the "Add Google Doc" tab 1204, a pull down menu 1206 is generated for adding a new document, a new spreadsheet, a new presentation, or an existing document from a second on-demand service (in this example Google®). A selection from the pull down menu 1206 initiates the sending of a request to add a new or existing content item to the first on-demand service by the user machine to a server and a dialog box for adding/creating the new content from the second on-demand service is opened on the user's machine.

FIGS. 12A-12L, FIGS. 13A-13F, and FIGS. 14A-14D show an embodiment in which the first on-demand service is Salesforce.com®, Inc. and the second on-demand service is Google®. However, Salesforce.com®, Inc. and Google® are just examples. Any two on-demand services may be substituted for Salesforce.com®, Inc. and Google®.

Figure 12B:
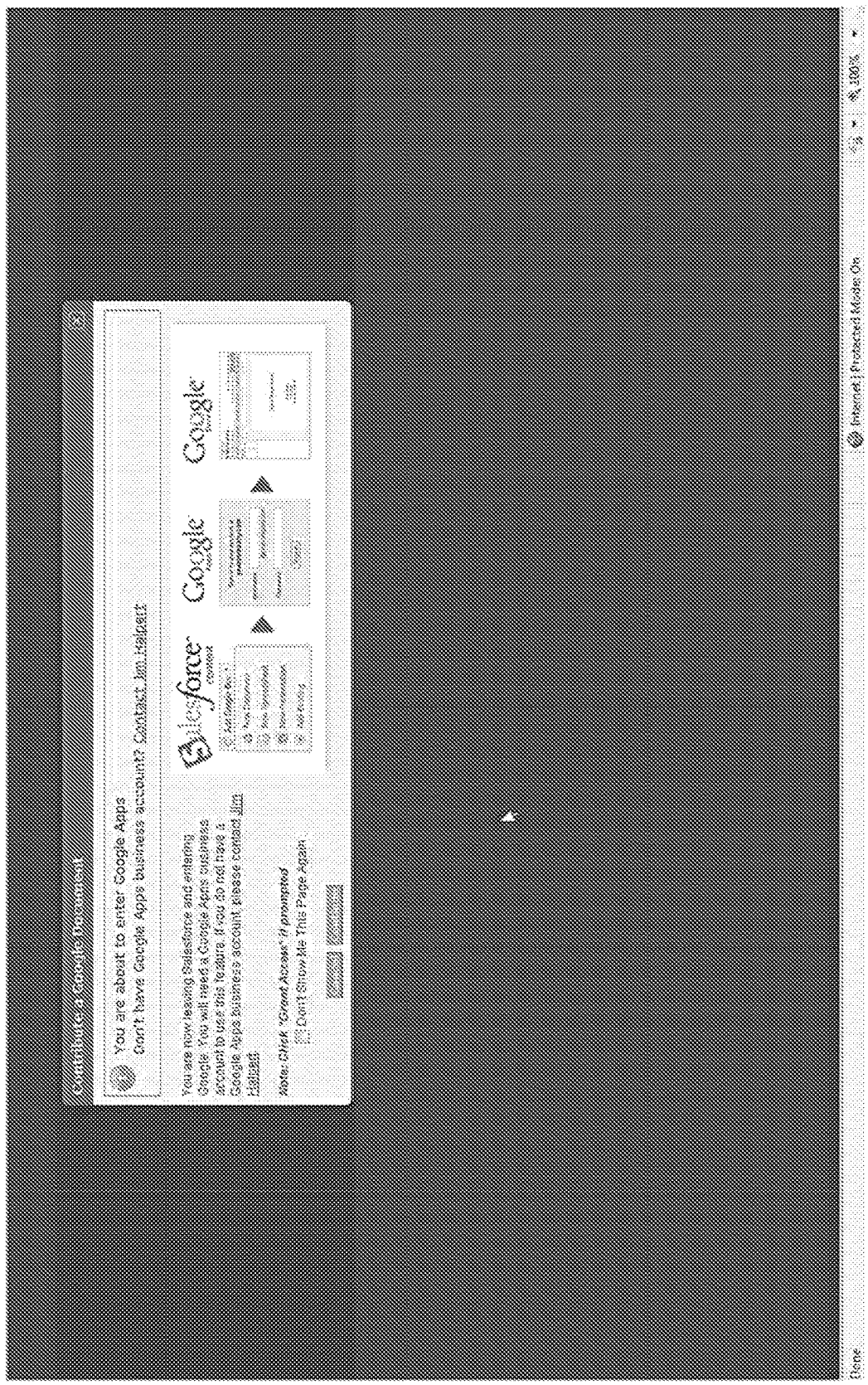

FIG. 12B shows a screenshot of a dialog prompt that informs the user that the user will be required to leave Salesforce.com (or any first on-demand service) and log in to Google Apps (or any second on-demand service) to locate or create the document. The user is also informed that the user needs to create an account in the Google Apps if the user presently does not have an account.

Figure 12C:
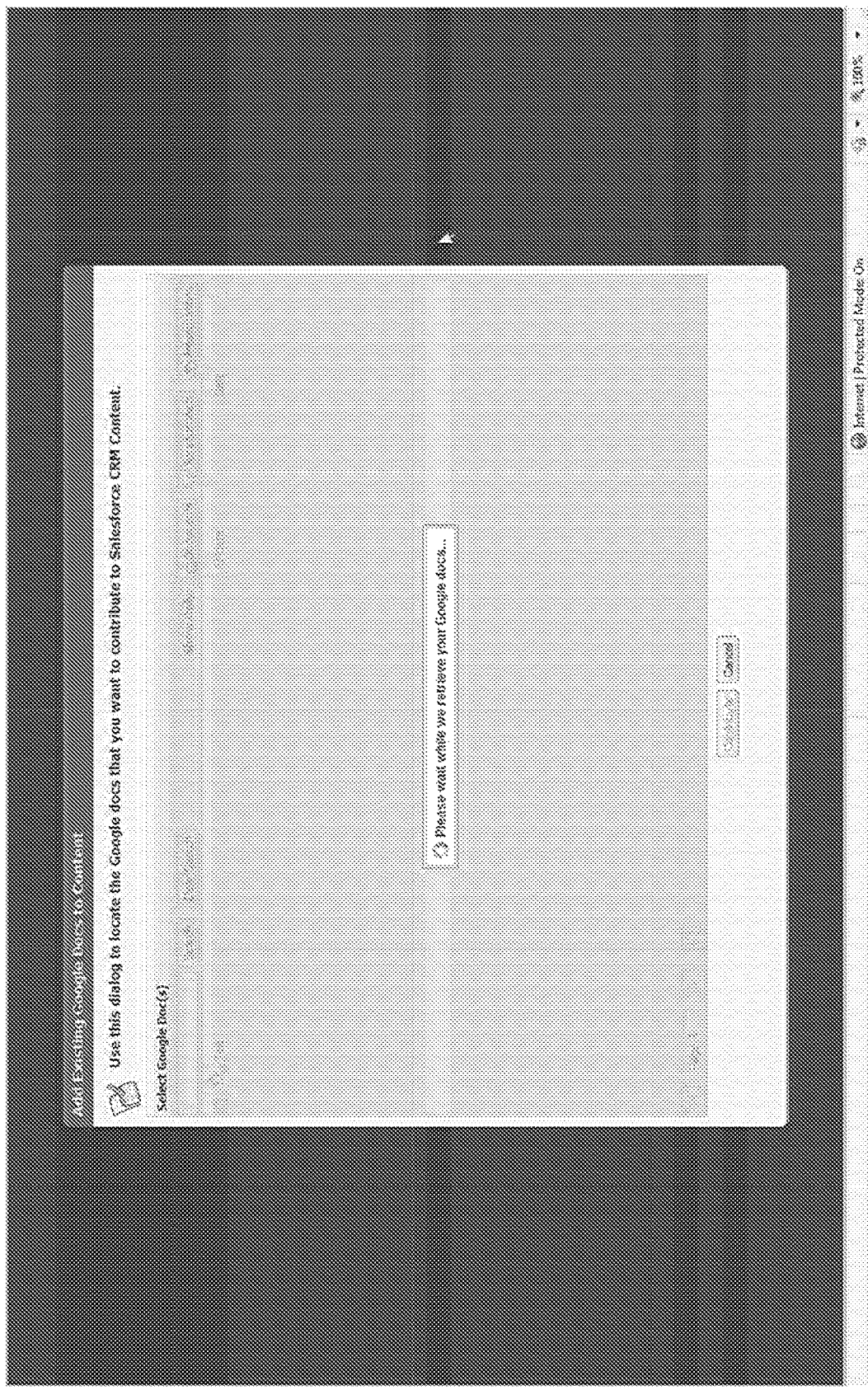

FIG. 12C shows a screenshot of a dialog box 1220 that informs the user that available documents (e.g., the Google Docs®) are being retrieved and will be displayed for the user's selection for contribution to their Salesforce content. During the display of dialog box 1220, a request from Salesforce.com (on any first on-demand service) is sent to Google (or any second on-demand service). The request includes (1) a request for access to the user's account on the second on-demand service (e.g., to the Google apps account)

and (2) a request for the ID or URL of the document that will be selected by the user once inside the user's account on the second on-demand service (e.g., the user's Google Apps account).

Figure 12D:
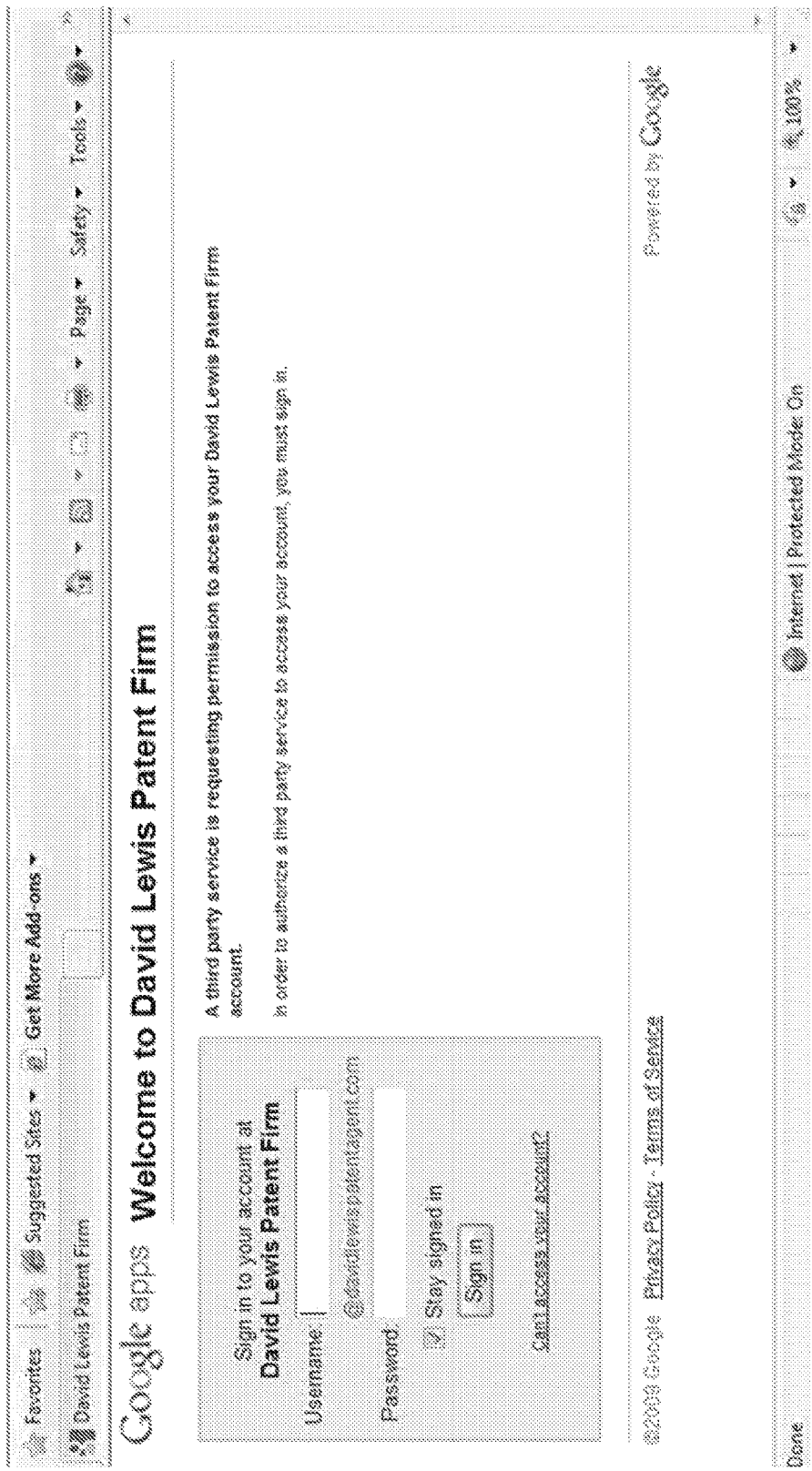

FIG. 12D shows a screenshot of a login screen 1226 of Google Apps (or the second on-demand service) generated in response to the user request for content from Google Apps placed in the Salesforce application (first on-demand service). The Google Apps (or the second on-demand service) notifies the user they must login to authenticate that they wish to allow a "third party service" the Salesforce application to access the Google Apps service. In an embodiment, the user must sign in before Google grants access. In an embodiment, Salesforce attempts to provide the user information on record for signing in, but if that does not work, or if the data is not on record at Salesforce, the user signs in manually.

Figure 12E:

FIG. 12E shows a screenshot of the user signed on to the Google Docs portion 1230 of Google Apps. The user selects an existing file (or creates a new file) that will be associated with the content item being created at Salesforce. The ID or URL of the file that was requested by the Salesforce user is then sent to Salesforce (first on-demand service). Column 1232 identifies what content is currently shared with other users. The Google Docs window 1230 is subsequently closed if the user accepts a prompt (not shown) to close the window.

Figure 12F:
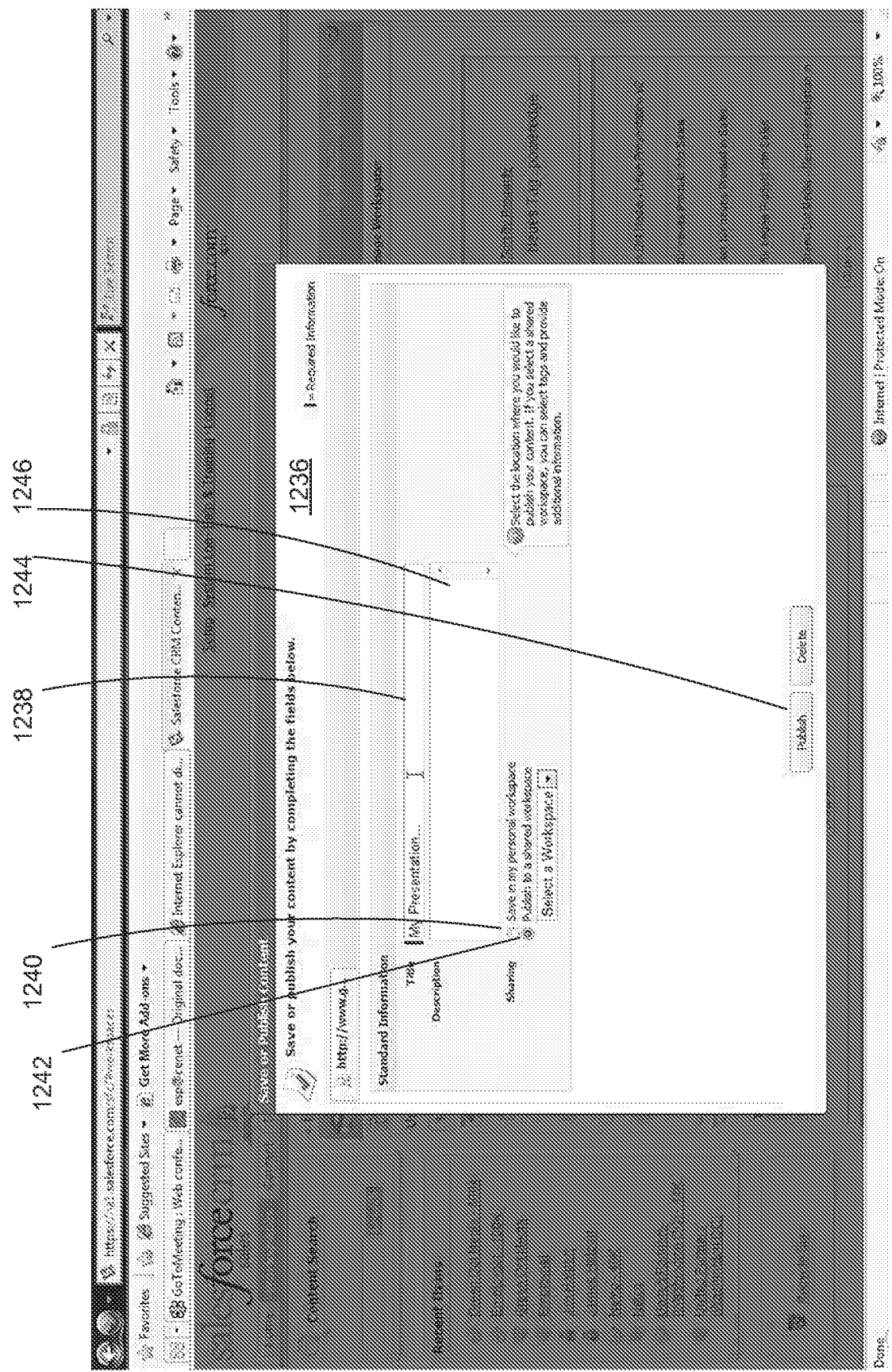

FIG. 12F shows a screenshot of an overlay dialog page 1236 to workspace page 1200 of the first on-demand service (Salesforce) of FIG. 12A. The overlay dialog page 1236 provides fields 1238 for naming the content item that will be associated with the selected Google document. Overlay dialog page 1236 also provides the user with a choice of selection of where to publish content. The user may select to either save the content item to a personal workspace by selecting sharing selection 1240, or to publish the content to a shared workspace by selecting sharing selection 1242. In the event the user selects to publish to a shared workspace, the user may select tags and provide additional information about the soon to be published content in the description entry area 1246. The user publishes the content by selecting the publish button 1244.

Figure 12G:
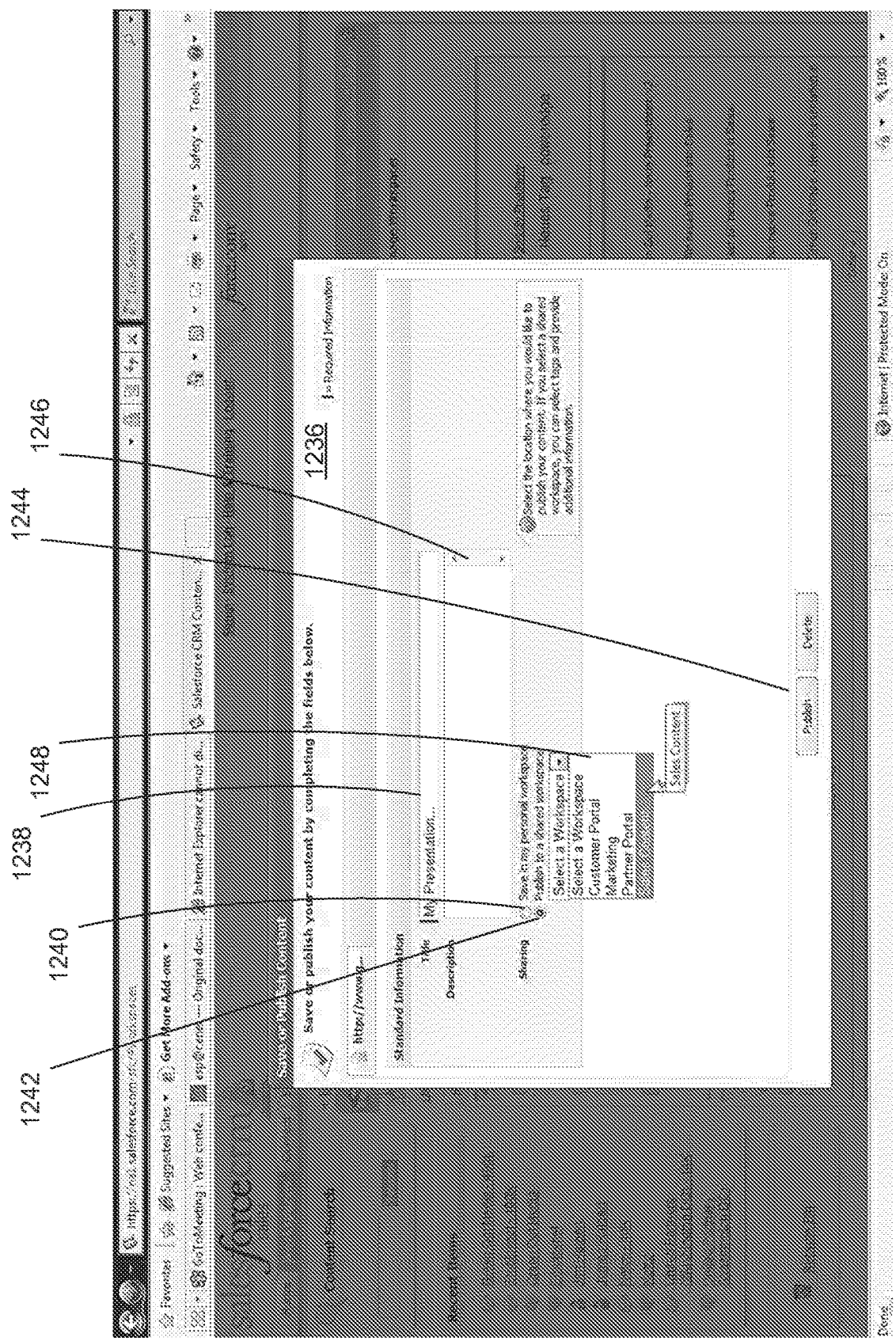

FIG. 12G shows another screenshot of an overlay dialog page 1236 with the user selecting sharing selection 1242, and subsequently a pull down menu 1248 is utilized by the user to determine which workspace to use for the published shared content.

Figure 12H:
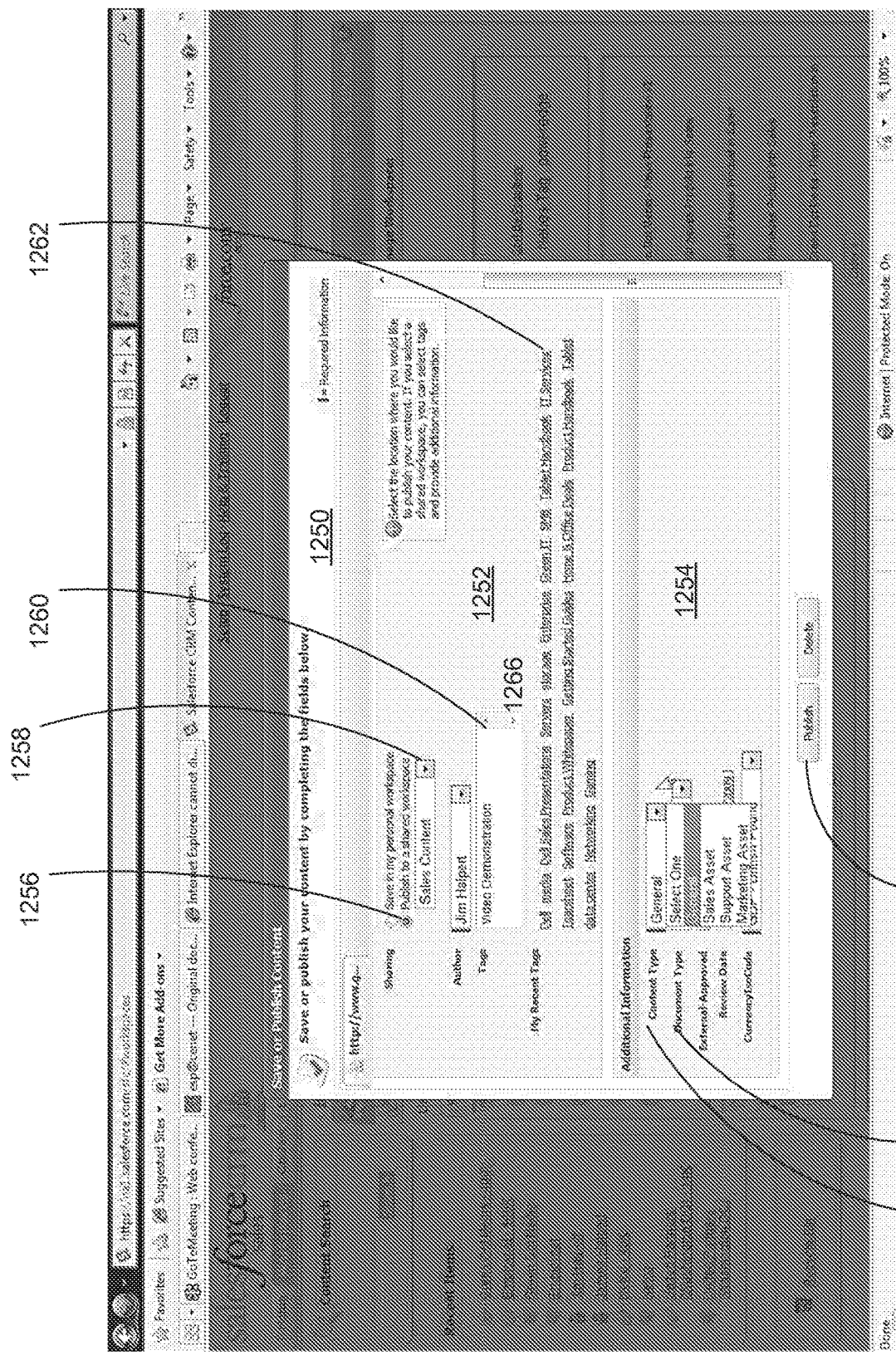

FIG. 12H shows a screenshot of an overlay dialog page 1250 configured for the user to provide classification for soon to be published content by providing tags from a tag area 1252 and additional information from an additional information area 1254. In the event the user selects to publish to a shared workspace by choosing sharing selection 1256, the user subsequently selects a workspace (destination area) to publish the content to from a pull down menu 1258. Tags are assigned to the content in area 1260. The user may select suggested tags from a most recent used tag list 1262. Information to be specified by the user in the additional information area 1254 includes the content type 1264 via a pull down menu, the document type 1266 via a pull down menu. The user utilizes the publish button 1268 when completing the entry of information within overlay dialog page 1250.

Figure 12I:
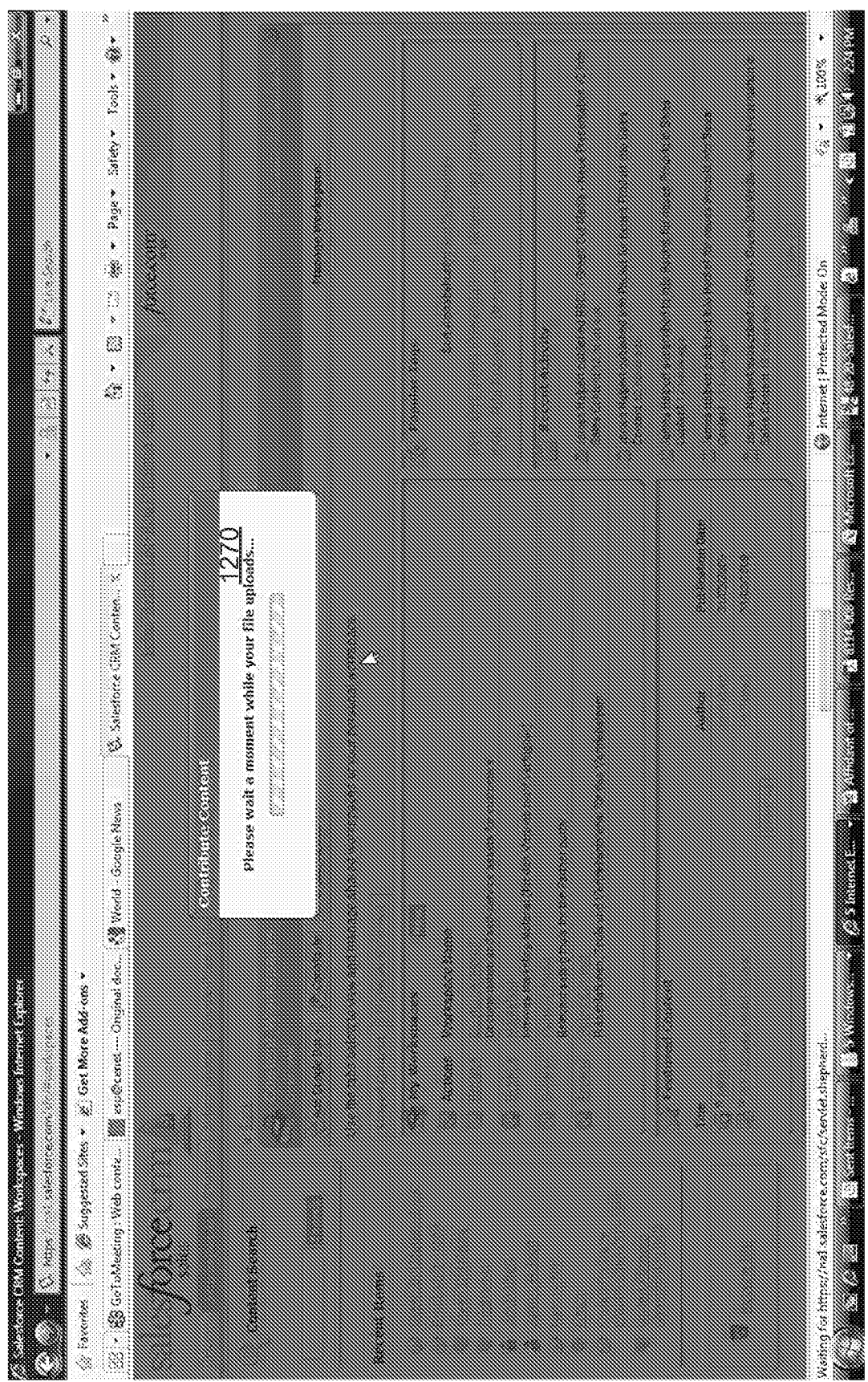

FIG. 12I is a screenshot of an overlay page 1270 that initiates upon the user selecting the publish button 1268 of FIG. 12H. During the display of the overlay page 1270, the user's choices for the content to publish initiates a process at Salesforce (first on-demand service) to (1) create the new content item, (2) associate the document ID retrieved from Google (second on-demand service) with the new content item, and (3) to add the classification, tags, workspace destination, etc. as part of creating the new content item.

Figure 12J:
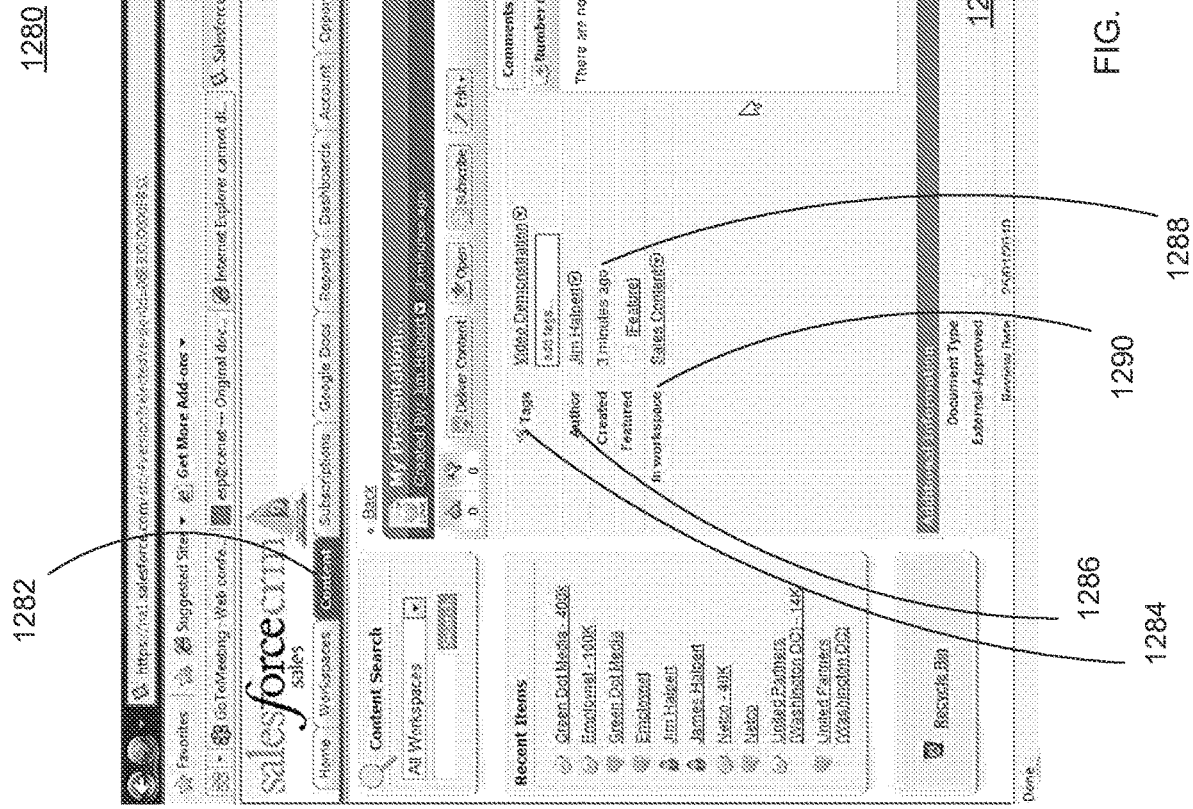
Figure 12K:
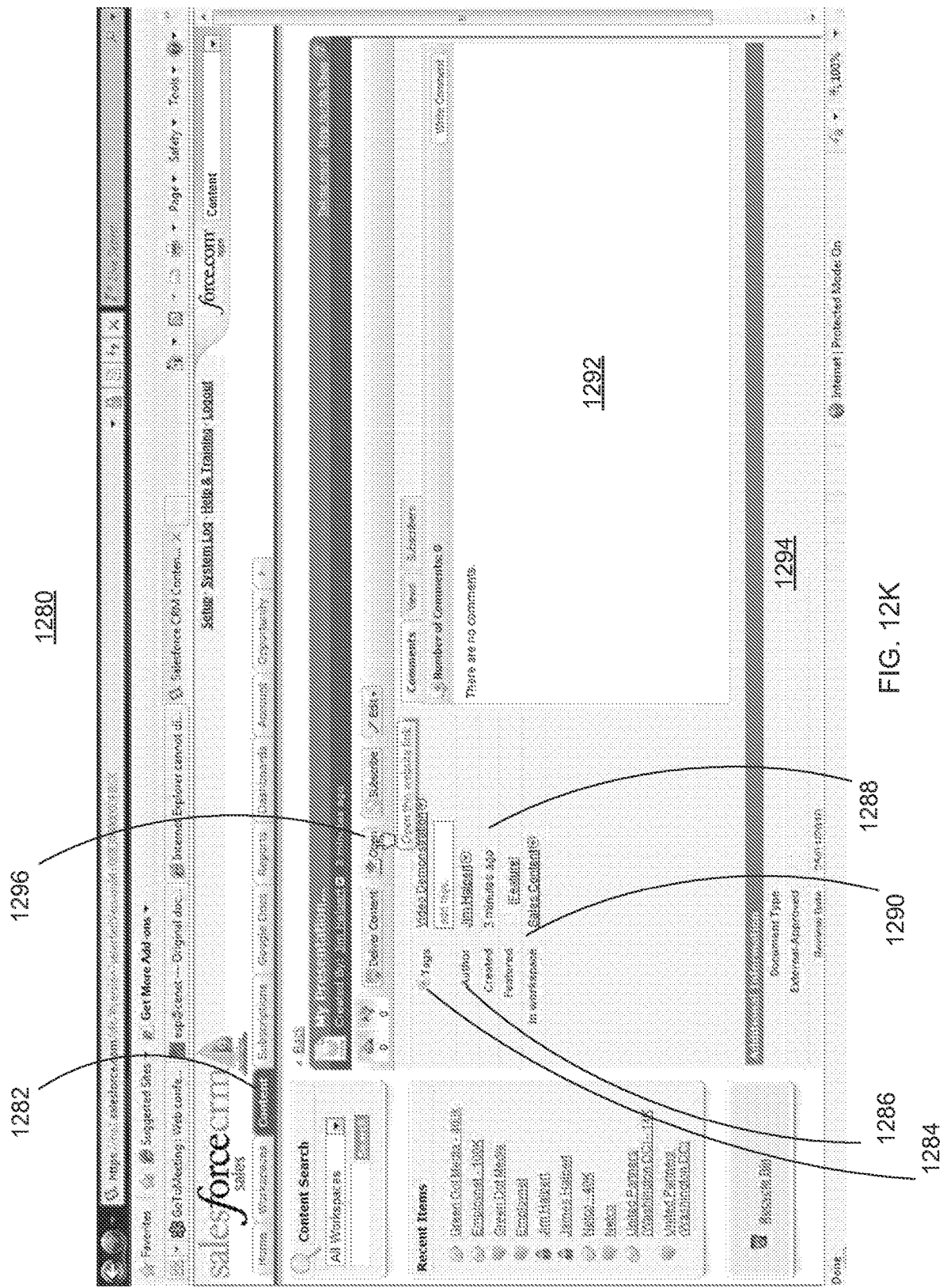
Figure 12L:
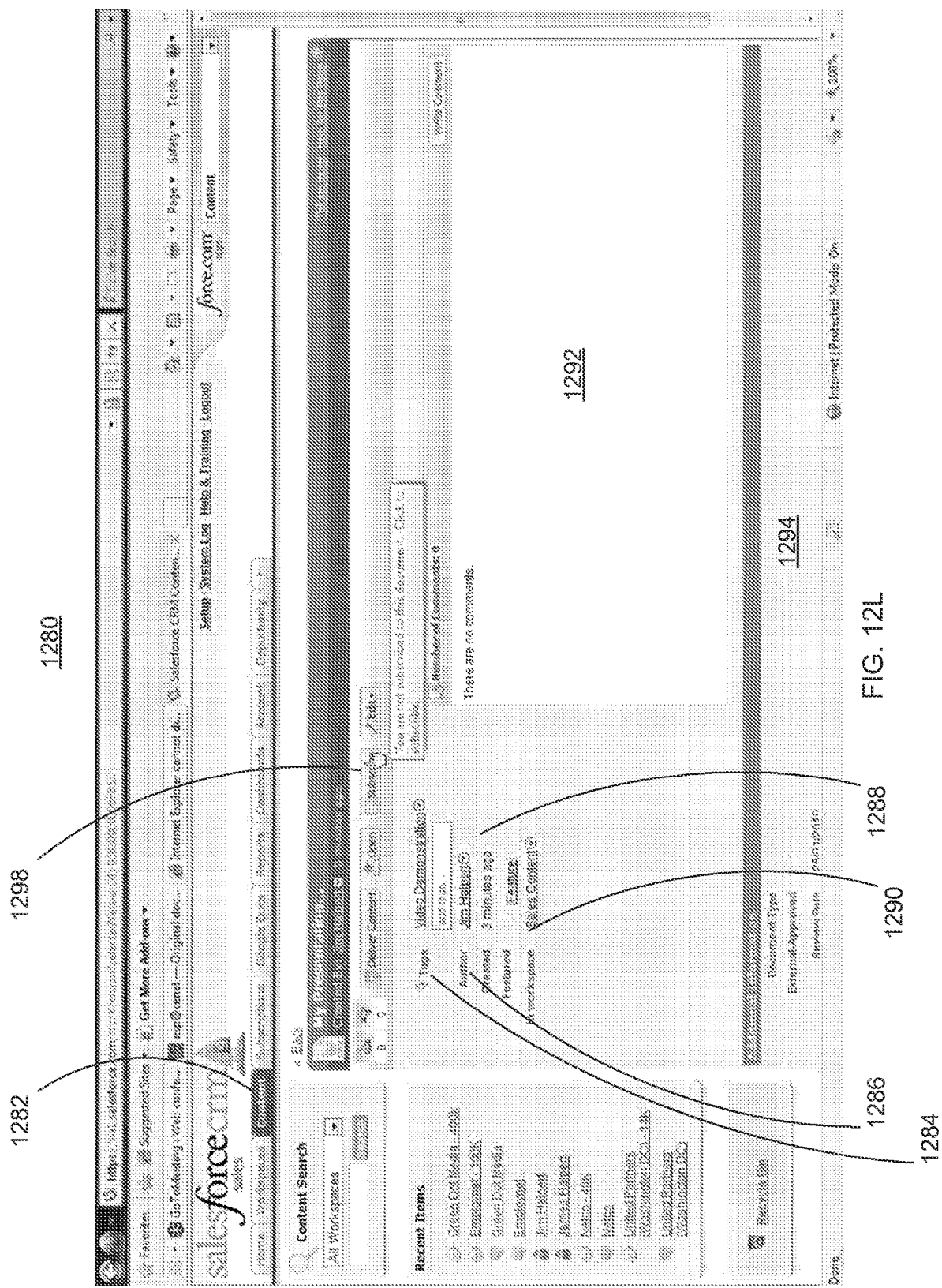

FIGS. 12J-12L are related screenshots of a content page 1280 that appears with the user selection of the content tab 1282 showing the newly created content item ("My Presentation" in the present example) that is then opened for viewing and editing. Information provided to the user includes tags 1284, document author 1286, time of content creation 1288 in first on-demand service (Salesforce), and workspace 1290 within which the content is published. A comment area 1292 is also provided for other users to comment on the published shared content. An additional information area 1294 is also provided.

In FIG. 12K in response to the user's selection of the open button 1296, a new browser window (user interface) (not shown) will open that loads a stored link to the Google document that was selected by the user in the previous screenshots 12A-12K.

In FIG. 12L in response to the user's selection of the subscribe button 1298, a subscription for the current user/admin ("Jim Halpert" in the example) to the content item is created. By subscribing to the content item, the user/admin is notified when the file is viewed, rated, commented on, etc.

FIGS. 13A-13F show a sequence of screenshots for contributing a content item in a second on-demand service from a workspace of a first on-demand service according to an embodiment of the invention.

Figure 13A:
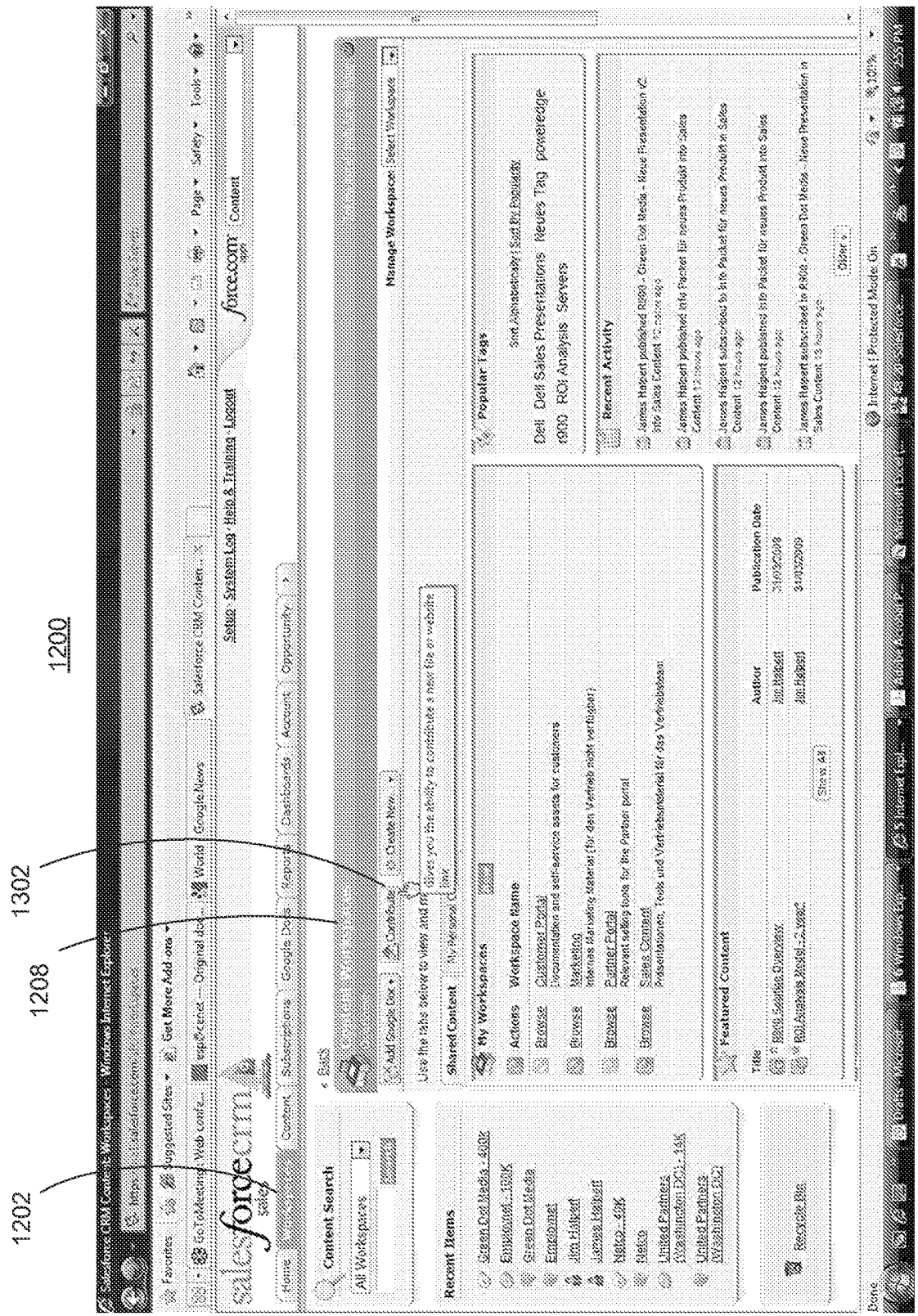
FIGS. 13A-13F show a sequence of screenshots for contributing content to a first on-demand service from a second on-demand service according to an embodiment of the invention.

FIG. 13A shows a screenshot of the workspace page 1200 with the workspace tab 1202 selected to display a content workspaces overview 1208 of a first on-demand service (in the present example Salesforce), as was described in FIG. 12A, and therefore like feature will not be described again. In FIG. 13A, in response to the selection of the "Contribute" tab 1302, a user is provided with the ability to contribute a new file (content) or website link to the first on-demand service (Salesforce in the present example).

Figure 13B:
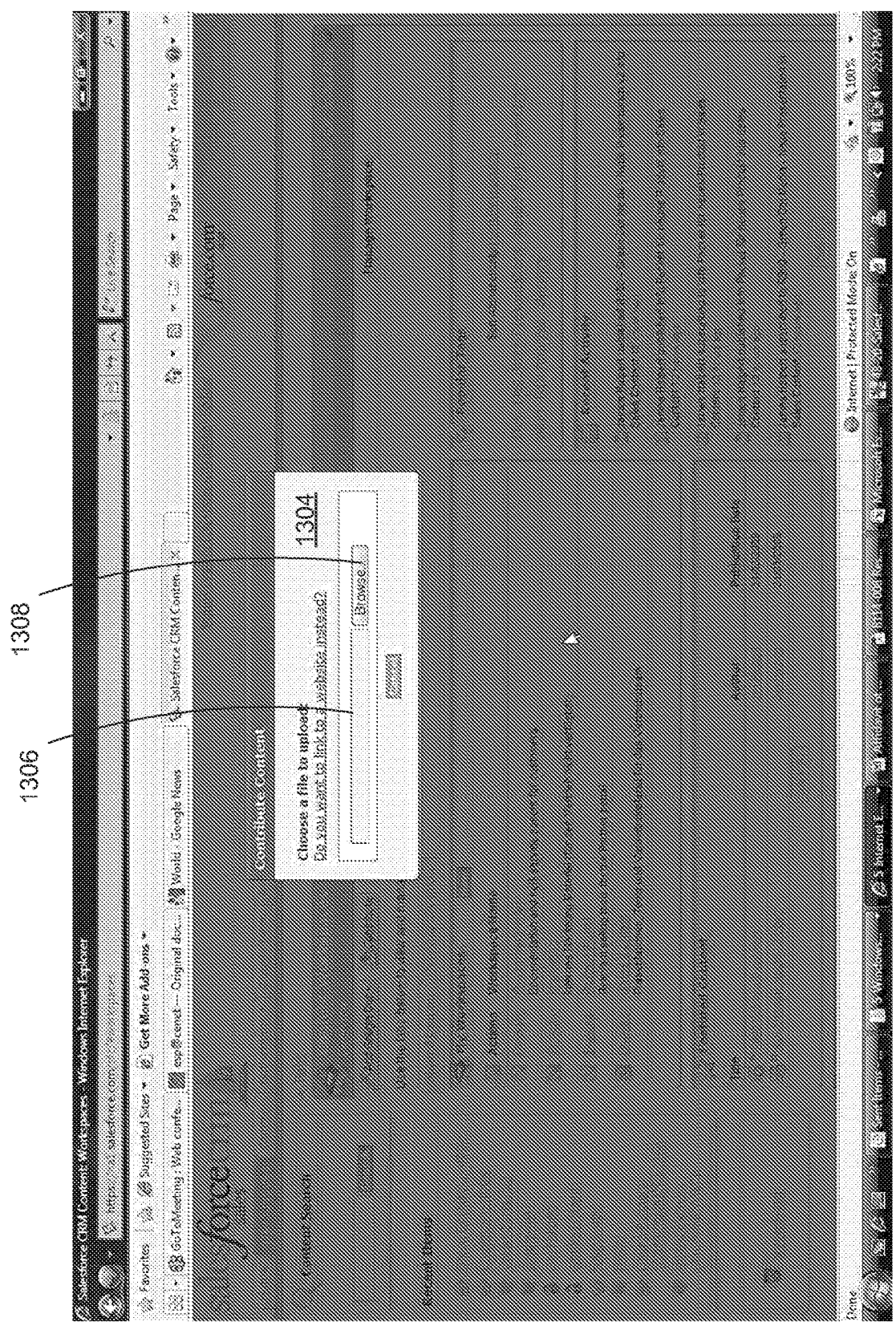

FIG. 13B shows a screenshot of an overlay dialog prompt 1304 to workspace page 1200 that is opened in response to the user's selection of the contribute button 1302 of FIG. 13A. The overlay dialog prompt 1304 of the first on-demand service is configured to allow the user to navigate to a file (content) on the client's computing device, or alternatively to provide a URL to a website or a file located at the website specified by the URL.

Figure 13C:
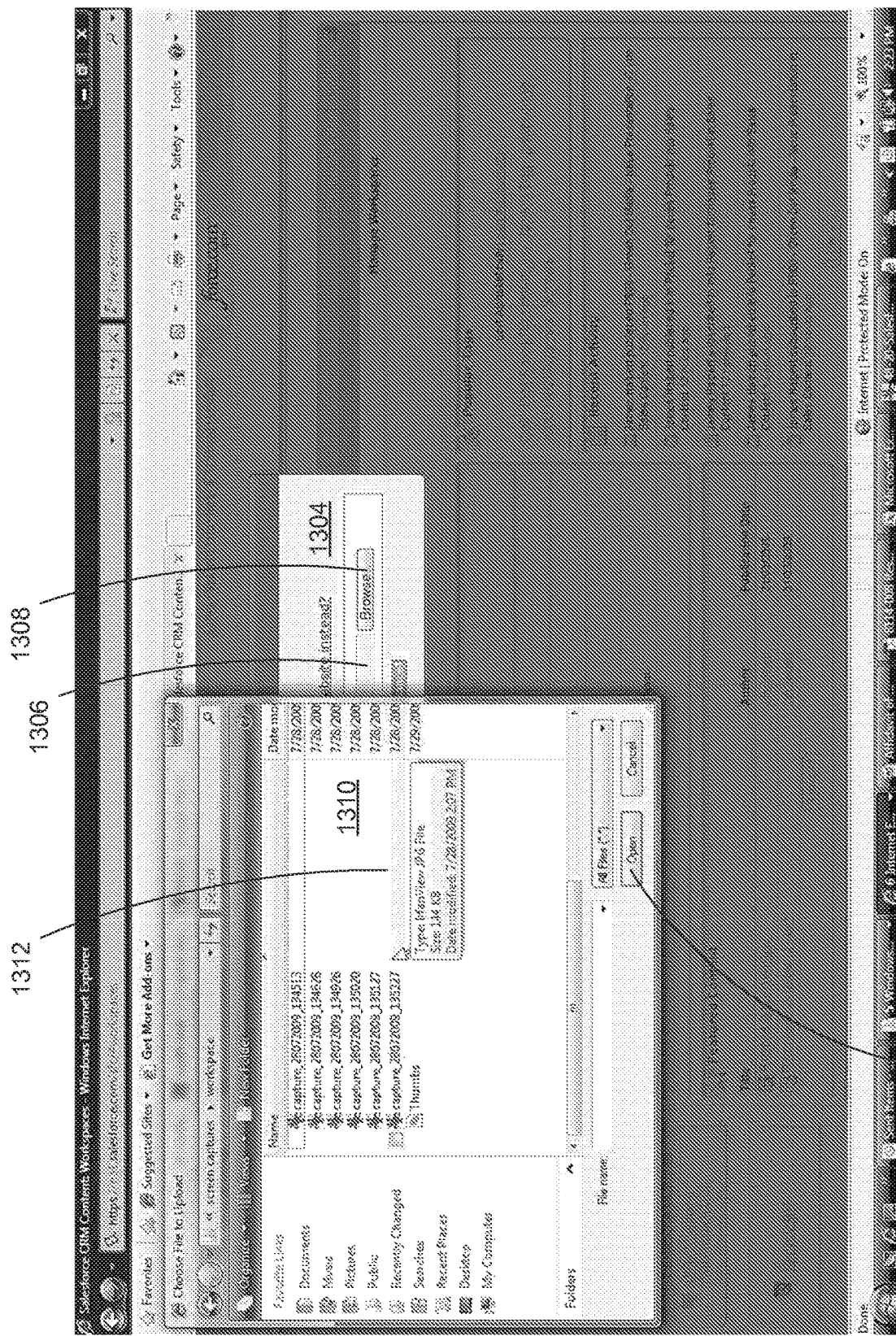

FIG. 13C an overly 1310 that lists files stored on the user's computing device appears in response to user file path entry into input field 1306 and selection of browse button 1308. A file/directory navigation application resident on the user's computing device is opened in order to find a listing or directory of files that correspond to the user entry in input field 1306. Subsequently, the user selects 1312 and opens 1314 a file from the list, and the file is uploaded to the first on-demand service.

Figure 13D:
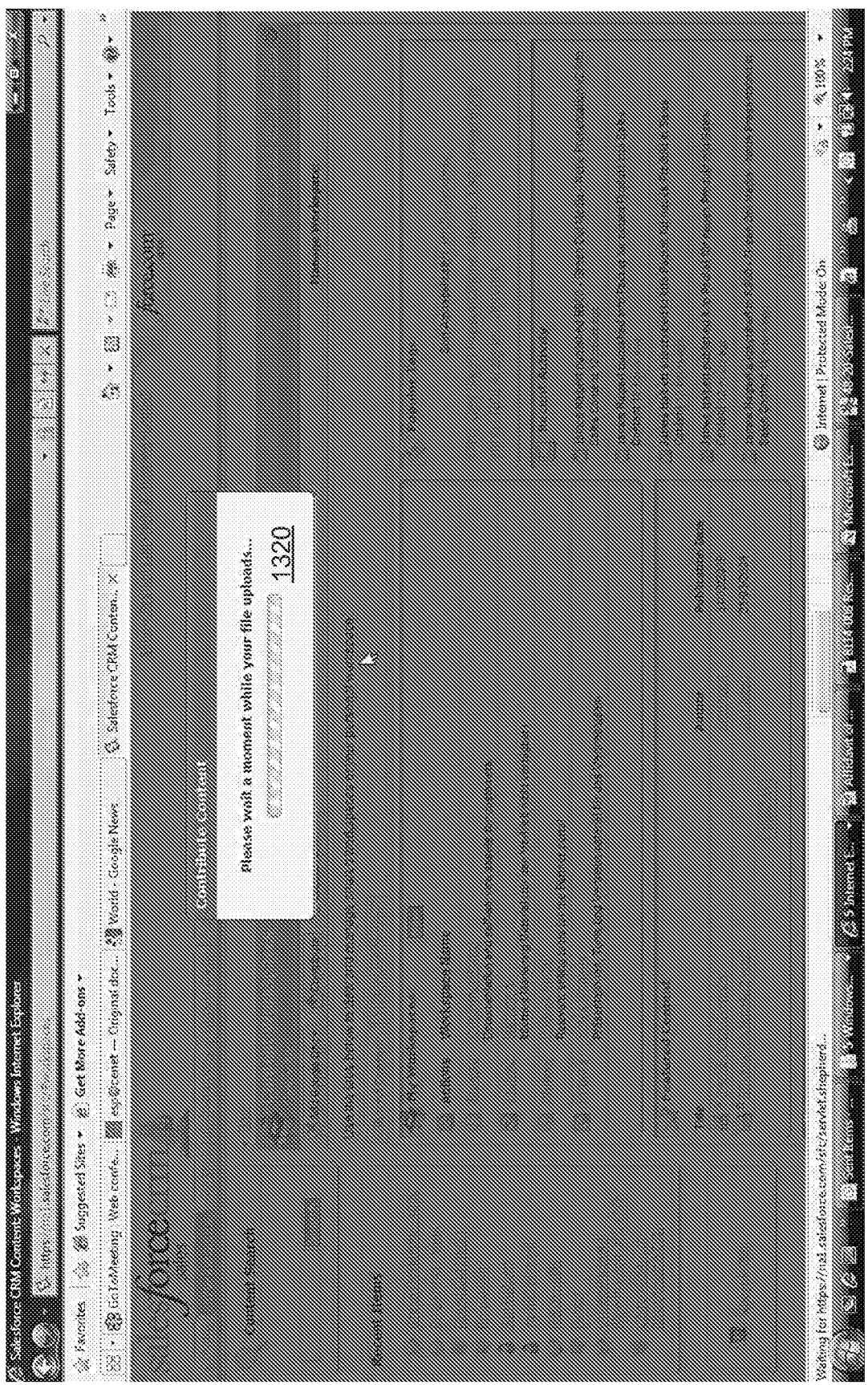

FIG. 13D is a screenshot of an overlay page 1320 that initiates upon the user selecting the open button 1314 of FIG. 13C. During the display of the overlay page 1320, the user's choice(s) for the file is uploaded (copied) to Salesforce (first on-demand service).

Figure 13E:
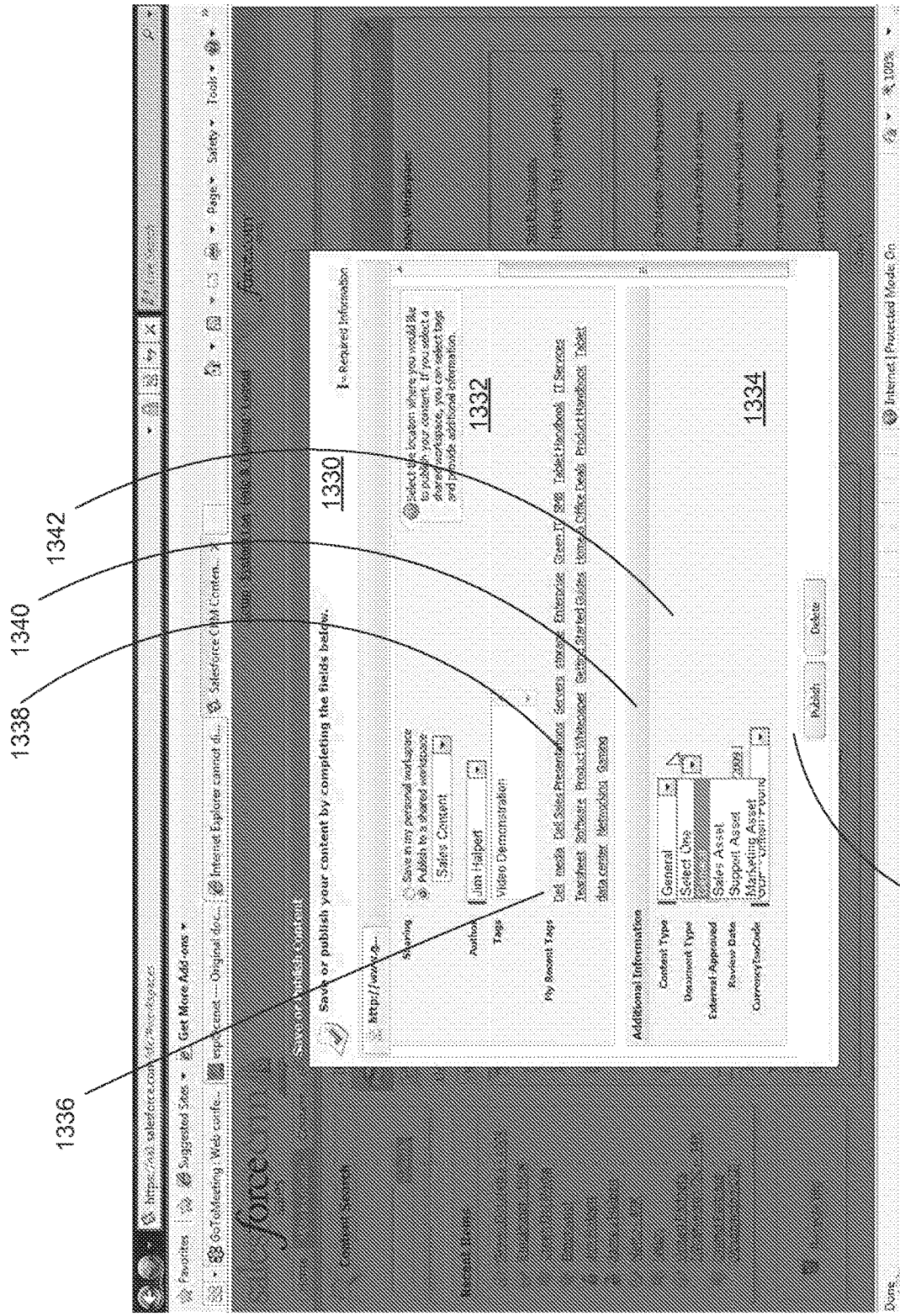

FIG. 13E is a screenshot of an overlay dialog page 1330 configured for the user to provide classification for the uploaded file(s) from the user's computing device by providing tags from a standard information area 1332 and additional information from an additional information area 1334. In the event the user selects to publish to a shared workspace by choosing sharing selection 1336, the user subsequently selects a workspace (destination area) to publish the content to from a pull down menu 1338. Tags are assigned to the content in tag area 1340. The user may select suggested tags from a most recent used tag list 1342. Information to be specified by the user in the additional information area 1334 includes the content type via a pull down menu (not shown), the document type via a pull down menu (not shown), etc. The user utilizes the publish button 1344 when completing the entry of information within overlay dialog page 1330.

Figure 13F:
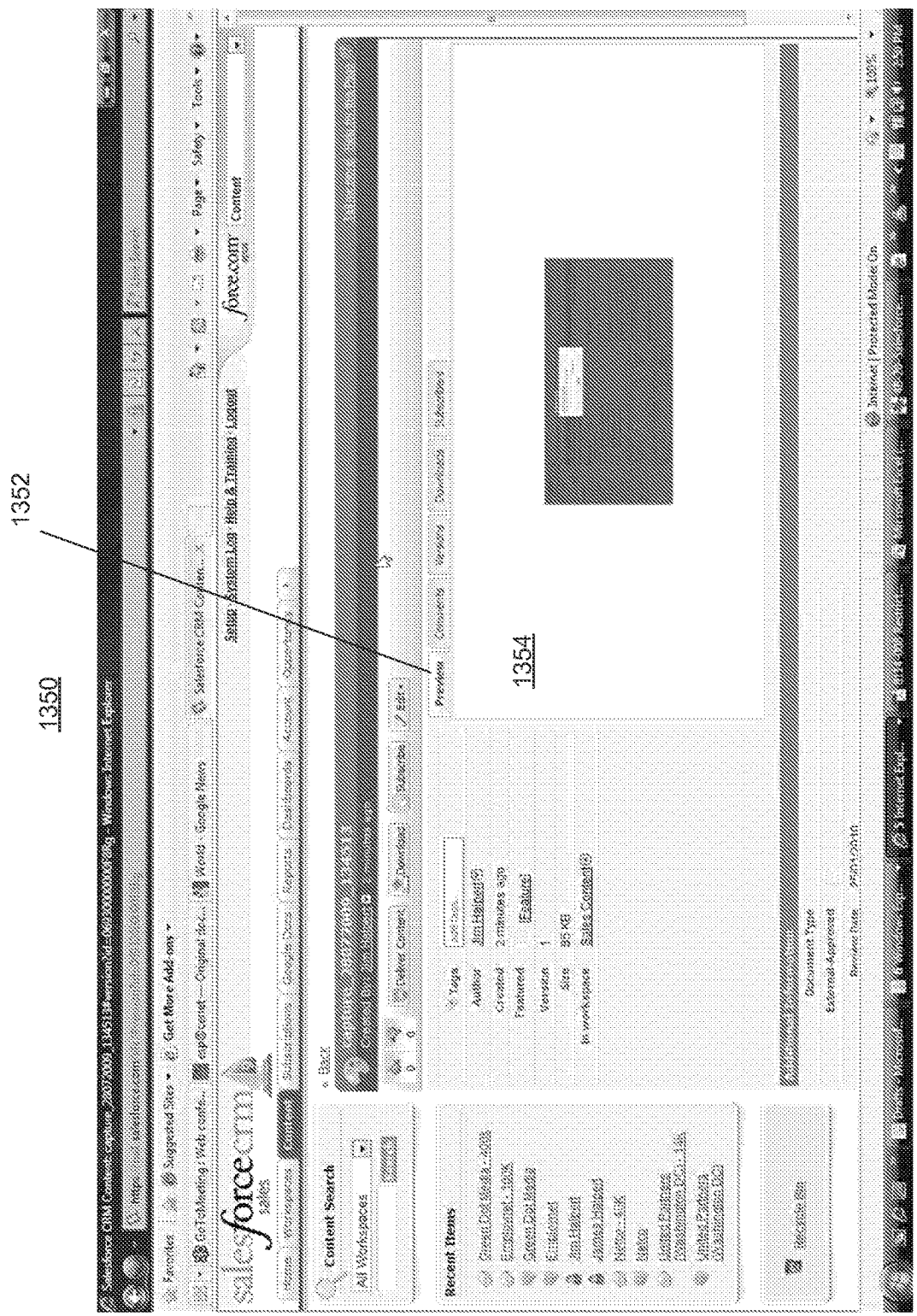

FIG. 13F is a screenshot of a preview page 1350 generated in response to user selection of preview button 1352. In the event a new content item associated with an uploaded file has been created in the first on-demand service, the preview button 1352 is provided for previewing the file's content in a preview area 1354 without requiring the user to open the file.

FIGS. 14A-14D are a series of subscription content page 1400 screenshots that organize user subscribed content based on content, tags, authors, or workspace according to an embodiment of the invention.

Figure 14A:
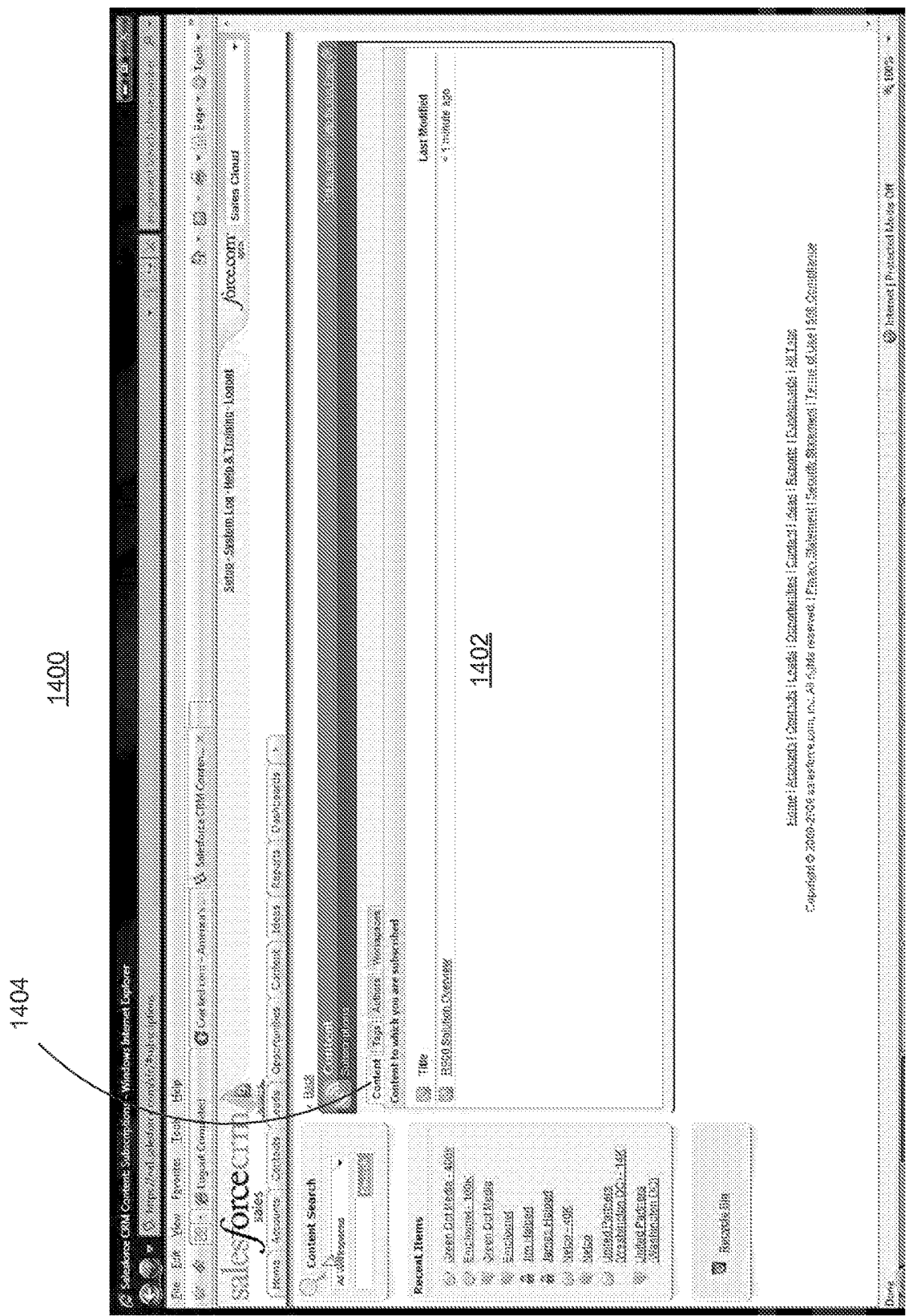
FIGS. 14A-14D are a series of subscription content screenshots that organize user subscribed content based on content, tags, authors, or workspace according to an embodiment of the invention.

In FIG. 14A user content that is subscribe to in an on-demand service (Salesforce in the present example) is displayed 1402 on subscription content page 1400 based on content in response to the user's selection of the content tab 1404.

Figure 14B:
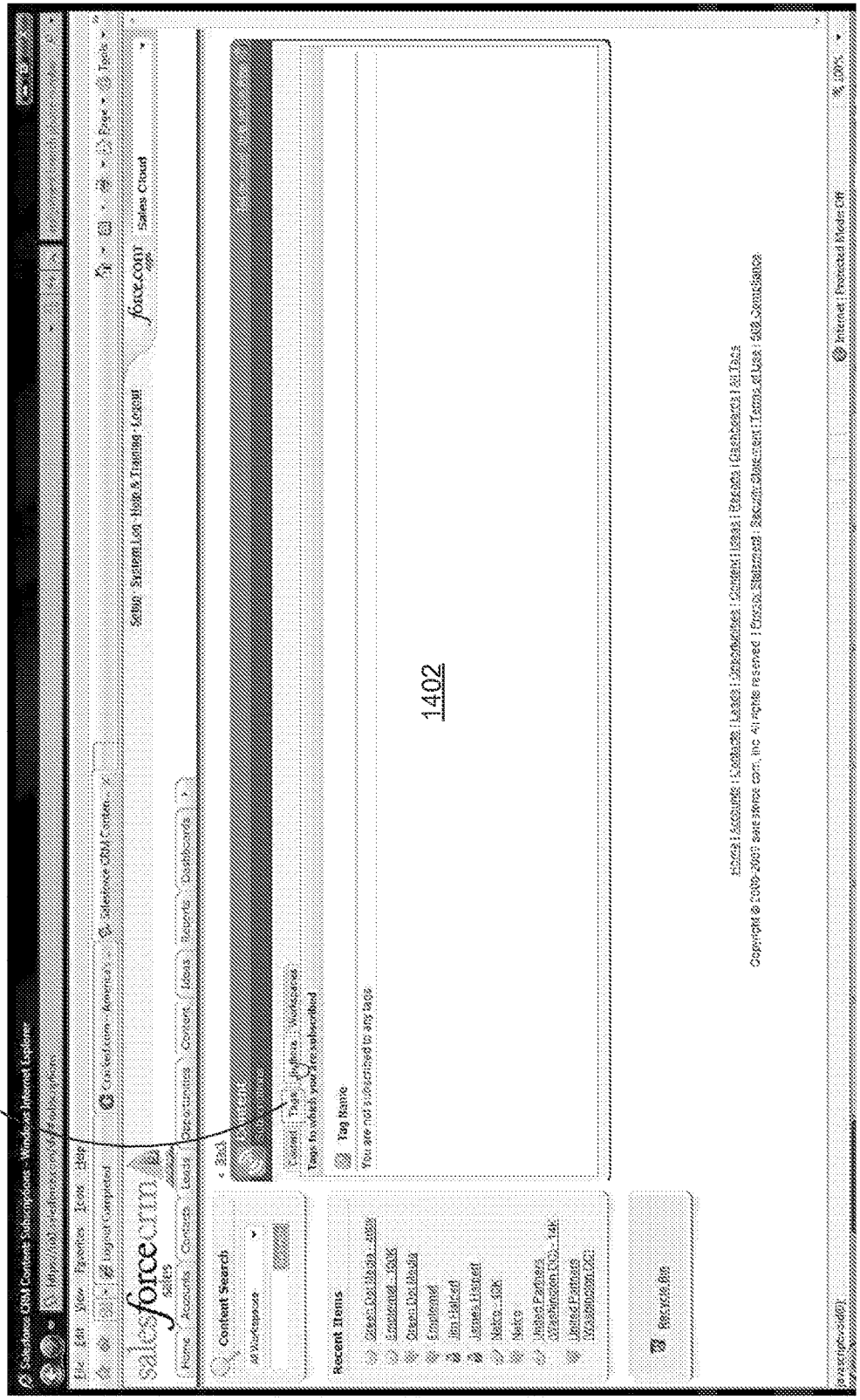

In FIG. 14B user content that is subscribe to in an on-demand service (Salesforce in the present example) is displayed 1402 on subscription content page 1400 based on tags attributed to the content in response to the user's selection of the tag tab 1406.

Figure 14C:
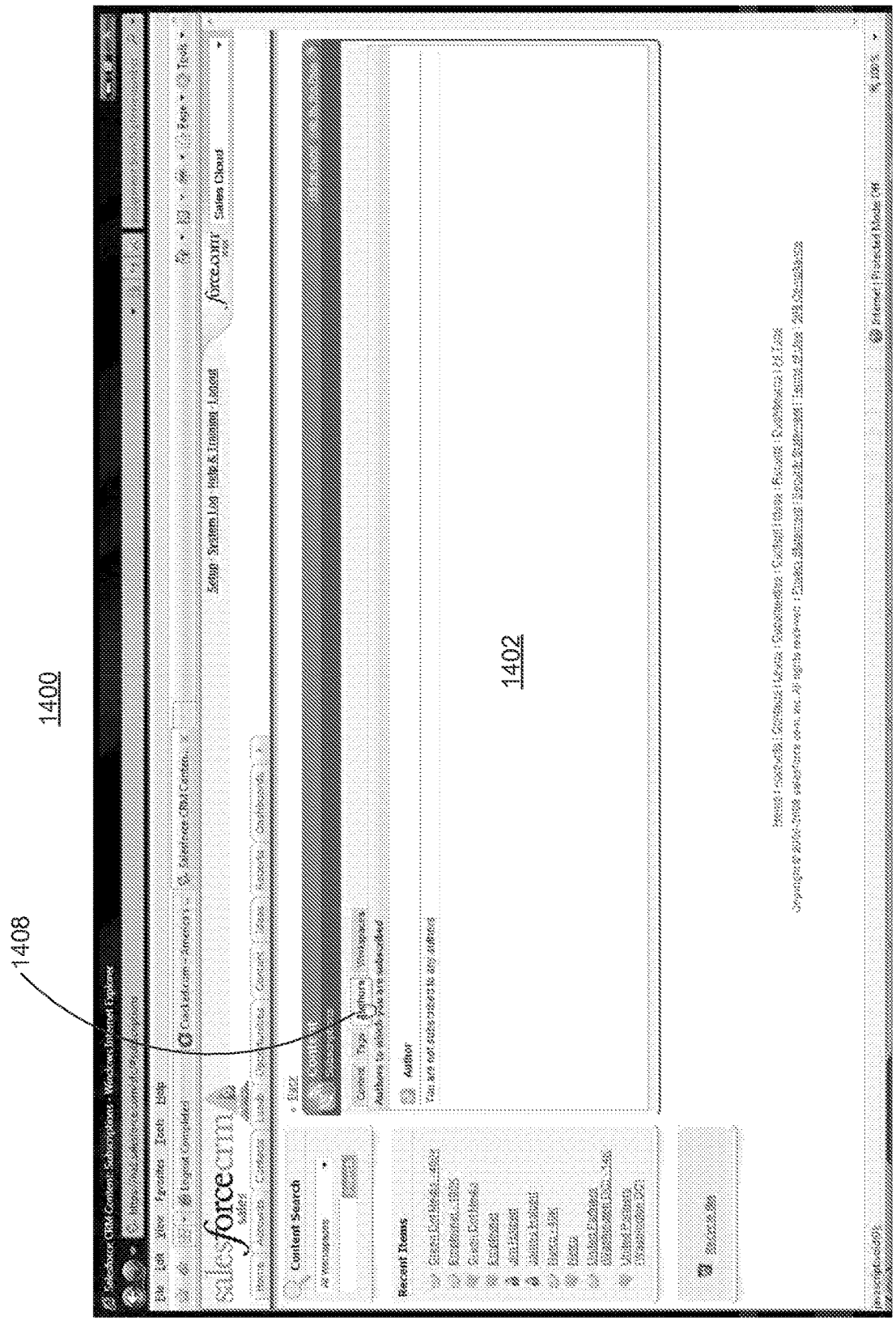

In FIG. 14C user content that is subscribe to in an on-demand service (Salesforce in the present example) is displayed 1402 on subscription content page 1400 based on Authors attributed to the content in response to the user's selection of the Author tab 1408.

Figure 14D:
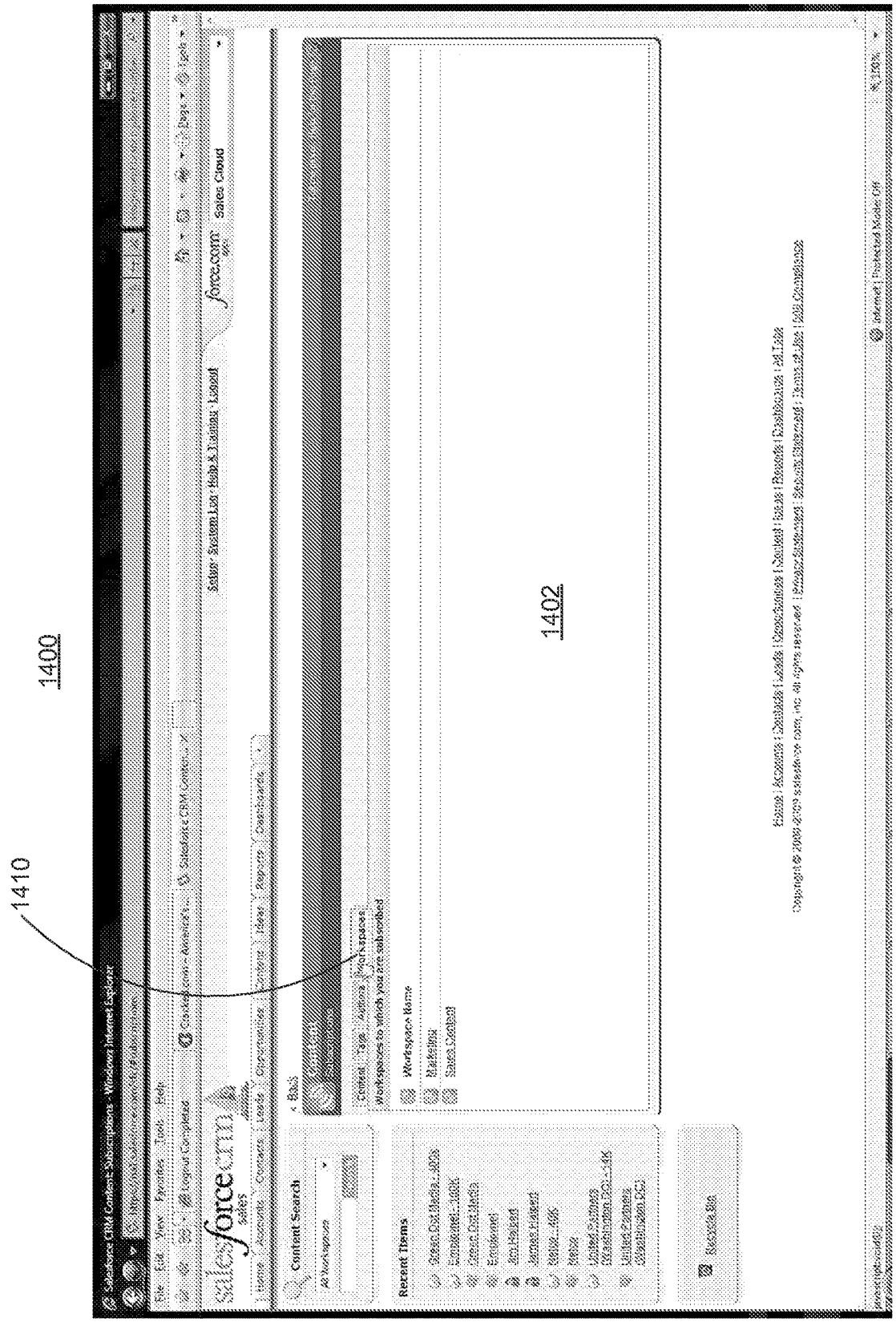

In FIG. 14D user content that is subscribe to in an on-demand service (Salesforce in the present example) is displayed 1402 on subscription content page 1400 based on workspaces containing the content in response to the user's selection of the workspaces tab 1410.

Method for Using the Environment (FIGS. 1A and 1B)

FIG. 15 shows a flowchart of an example of a method 1500 of using environment 10. In step 1510, user system 12 (FIGS. 1A and 1B) establishes an account. In step 1512, one more tenant process spaces 104 (FIG. 1B) are initiated on behalf of user system 12, which may also involve setting aside space in tenant space 112 (FIG. 1B) and tenant data 114 (FIG. 1B) for user system 12. Step 1512 may also involve modifying application metadata to accommodate user system 12. In step 1514, user system 12 uploads data. In step 1516, one or more data objects are added to tenant data 114 where the uploaded data is stored. In step 1518, methods and the code for generating the WebPages associated with FIGS. 4-14 may be implemented. The user of method 1500 may represent an organization that is a tenant of system 16 (FIG. 1A) or may be associated with the tenant. In an embodiment, each of the steps of method 1500 is a distinct step. In another embodiment, although depicted as distinct steps in FIG. 12, steps 1502-1518 may not be distinct steps. In other embodiments, method 1500 may not have all of the above steps and/or may have other steps in addition to or instead of those listed above. The steps of method 1500 may be performed in another order. Subsets of the steps listed above as part of method 1500 may be used to form their own method.

Method for Creating the Environment (FIGS. 1A and 1B)

Figure 16:
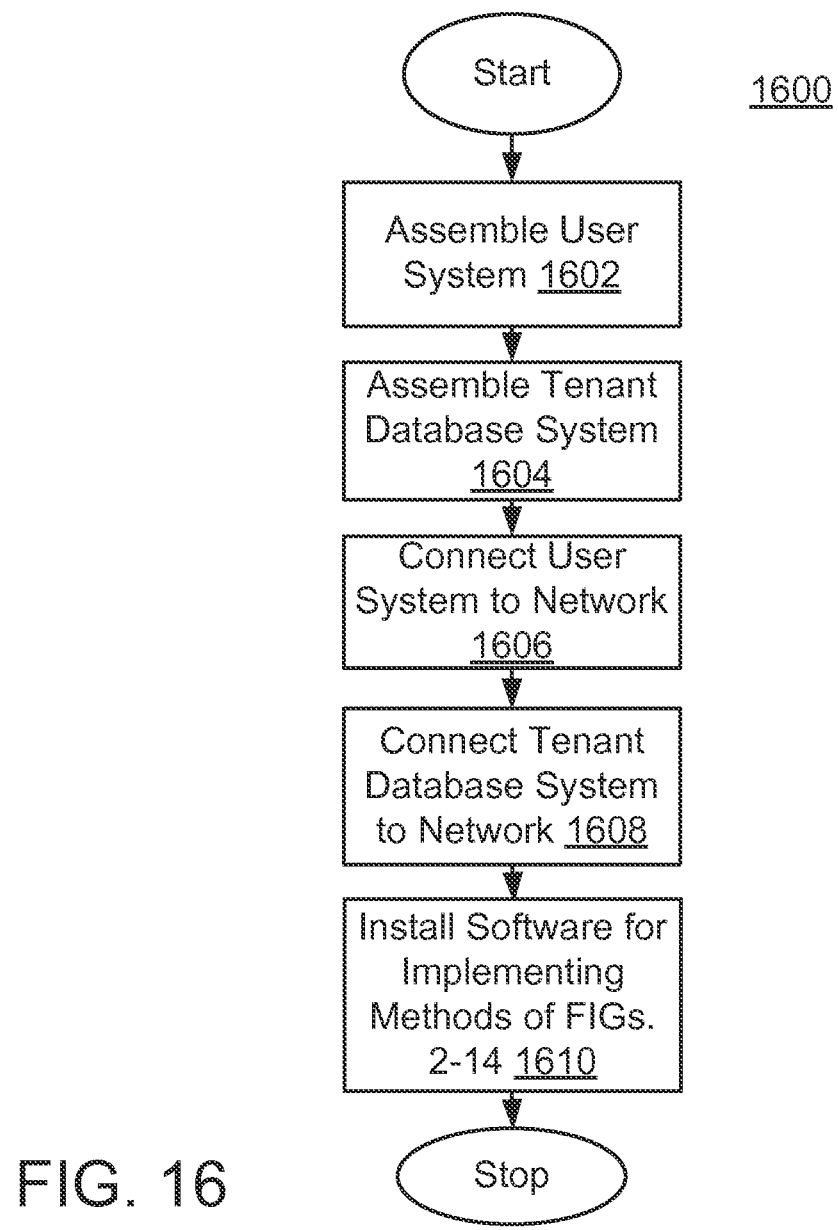
FIG. 16 illustrates a flowchart of a method of making the environment of FIGS. 1A and 1B.

FIG. 16 is a method of making environment 10, in step 1602, user system 12 (FIGS. 1A and 1B) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1604, system 16 (FIGS. 1A and 1B) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers $100_1$-$100_N$, system process space 102, tenant process spaces 104, tenant management process space 110, tenant space 112, tenant data 114, and application metadata 116 (FIG. 1B).

In step 1606, user system 13 is communicatively coupled to network 104. In step 1608, system 16 is communicatively coupled to network 104 allowing user system 12 and system 16 to communicate with one another (FIG. 1B). In step 1610, one or more instructions may be installed in system 16 (e.g., the instructions may be installed on one or more machine readable media, such as computer readable media, therein) and/or system 16 is otherwise configured for performing the steps of methods and generating the WebPages associated with FIGS. 4-14. For example, as part of step 1610, one or more instructions may be entered into the memory of system 16 for creating document links and sharing documents between on-demand systems. In an embodiment, each of the steps of method 1600 is a distinct step. In another embodiment, although depicted as distinct steps in FIG. 13, steps 1602-1608 may not be distinct steps. In other embodiments, method 1600 may not have all of the above steps and/or may have other steps in addition to or instead of those listed above. The steps of method 1600 may be performed in another order. Subsets of the steps listed above as part of method 1600 may be used to form their own method.

Extensions and Alternatives

Alternatively or additionally, some or all of the relational information may be automatically retrieved from the second on-demand service (e.g., a search may be performed automatically for the relational information and/or the relational information may be organized in a standardized or already known format so that the relational information may be easily found). In an embodiment, the relational information may be associated with a pointer prior to publishing the pointer. The relational information may be used for categorizing the pointer and/or grouping the pointer with other related information.

In an embodiment, a user of a first on-demand database may also be able to establish and/or modify the context (e.g., the category) of a pointer after the pointer has been published in addition to or instead of establishing the relationship and/or relevance prior to publishing the pointer.

In an embodiment, while a pointer or link may still be placed on one or more web pages of the first and/or second on-demand database for initiating the establishment of the pointer, the user of the first on-demand database may open (e.g., via a browser) both on-demand databases, and the pointer is established in response to the user copying and pasting a document reference or identifier from one on-demand database to another on-demand database.

In an embodiment, the sharing of the documents may also include applying at least one process of the first on-demand service to at least one piece of content from the content in the second on-demand service, which may include using the indicator to locate the content. Furthermore, in the sharing of documents, the applying of at least one process of the first on-demand service may also include applying a search of content stored in the first on-demand service and content stored in the second on-demand service.

In an embodiment, the methods described within this specification may be applied to links that link a first on-demand service to multiple on-demand services.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory computer readable medium having program instructions stored thereon that are capable of causing a first system to perform operations comprising:
   causing, by a first on-demand service of the first system, a user interface to be displayed, wherein the user interface indicates first content, including one or more electronic documents, that is stored at a first data store of the first system, wherein the first content is associated with a first account of the first on-demand service, wherein the user interface includes a visual element that is operable to allow access to second content stored, via a second on-demand service, at a second data store of a second system via the user interface, wherein the second content is associated with a second account of the second on-demand service;
   the first on-demand service automatically logging into the second account via the user interface;
   the first on-demand service displaying, within the user interface, a listing of one or more items of the second content;
   responsive to receiving an indication that a particular item of the one or more items of second content has been selected:
      the first on-demand service retrieving the particular item of second content from the second data store, wherein the particular item of second content is an electronic document; and
      the first on-demand service causing the particular item of second content to be displayed within the user interface.

2. The computer readable medium of claim 1, wherein the operations further comprise:
   permitting a user to edit the displayed particular item via the user interface of the first on-demand service.

3. The computer readable medium of claim 1, wherein the operations further comprise:
   presenting, via the user interface, an entry field operable to receive a search input; and
   based on the received search input, conducting a search including searching the second content stored at the second data store of the second system.

4. The computer readable medium of claim 1, wherein the operations further comprise:
   allowing, via the user interface, a user to share the particular item with other users of the first on-demand service.

5. The computer readable medium of claim 1, wherein the operations further comprise:
   presenting, via the user interface, a screen soliciting account information of the second account; and
   in response to receiving the account information, storing the account information to facilitate the first on-demand service automatically logging into the second account.

6. The computer readable medium of claim 5, wherein the account information includes a username and password for the second account.

7. The computer readable medium of claim 1, wherein the first on-demand service automatically logging into the second account is responsive to receiving an indication that the visual element has been selected.

8. The computer readable medium of claim 1, wherein the operations further comprise:
   in response to the first on-demand service retrieving the particular item, storing the particular item in a storage area of the first on-demand service.

9. The computer readable medium of claim 1, wherein the operations further comprise:
   tracking selections of the particular item by users of the first on-demand service.

10. The computer readable medium of claim 9, wherein the operations further comprise:
    presenting, via the user interface, a visual indicating results from an analysis of the tracked selections.

11. A method, comprising:
    causing, by a first on-demand service of a first system, a user interface to be displayed, wherein the user interface indicates first content that is stored at a first data store of the first system, wherein the first content is associated with a first account of the first on-demand service, wherein the user interface includes a visual element that is operable to allow access to second content stored, via a second on-demand service, at a second data store of a second system via the user interface, wherein the second content is associated with a second account of the second on-demand service;
    the first on-demand service automatically logging into the second account via the user interface; and
    the first on-demand service creating an association between the first account and the second account, wherein the creating the association includes displaying, within the user interface, a listing of one or more items of the second content; and
    responsive to receiving an indication that a particular item of the one or more items of second content has been selected:
       the first on-demand service retrieving the particular item of the second content from the second data store, wherein the particular item of second content is an electronic document;
       the first on-demand service causing the particular item of second content to be displayed within the user interface; and the first on-demand service permitting the displayed particular item of second content to be edited within the user interface.

12. The method of claim 11, further comprising:
displaying, via the user interface, a content search area that includes one or more fields that allow a user to formulate a search query; and
based on a received search query from the user, searching the first and second contents.

13. The method of claim 11, further comprising:
the first on-demand service receiving, via the user interface, account information of the second account; and
the first on-demand service storing the account information to facilitate the first on-demand service automatically logging into the second account.

14. The method of claim 11, further comprising:
the first on-demand service receiving, via the user interface, a selection by a user to share the particular item; and
the first on-demand service sharing the particular item with one or more additional users.

15. A computing system, comprising:
a processor; and
a memory coupled to the processor, wherein the memory has computer instructions stored thereon that are capable of being executed by the computing system to cause operations comprising:
  causing, by a first on-demand service of the computing system, a user interface to be displayed, wherein the user interface indicates first content that is stored at a first data store of the computing system, wherein the first content is associated with a first account of the first on-demand service, wherein the user interface includes a visual element that is operable to allow access, via the user interface, to second content stored, via a second on-demand service, at a second data store of a second system, wherein the second content is associated with a second account of the second on-demand service;
  automatically logging into the second account via the user interface; and
  the first on-demand service displaying, within the user interface, a listing of one or more items of the second content; and
  responsive to receiving an indication that a particular item of the one or more items of second content has been selected:
    retrieving the particular item of the second content from the second data store, wherein the particular item of second content is an electronic document; and
    the first on-demand service causing the particular item of second content to be displayed within the user interface.

16. The computing system of claim 15, wherein the operations further comprise:
providing, via the user interface, one or more search fields operable to receive a search query from a user; and
searching the first and second contents based on a received search query from the user.

17. The computing system of claim 15, wherein the user interface permits viewing and editing of the displayed particular item.

18. The computing system of claim 15, wherein the operations further comprise:
the first on-demand service receiving, via the user interface, login credentials of the second account; and
the first on-demand service storing the login credentials to facilitate the first on-demand service automatically logging into the second account.

19. The computing system of claim 15, wherein the operations further comprise:
in response to a request from a user, sharing access to the particular item to one or more additional users of the first on-demand service.

* * * * *